(12) United States Patent
Mai

(10) Patent No.: US 7,572,046 B2
(45) Date of Patent: *Aug. 11, 2009

(54) STRUCTURE OF OPTIC FILM

(75) Inventor: Chien-Chin Mai, No. 6, Gongye 2nd Rd., Renwu Shiang, Kaohsiung County 814 (TW)

(73) Assignees: Gamma Optical Co., Ltd., Kaohsiung County (TW); Chien-Chin Mai, Kaohsiung County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/875,970

(22) Filed: Oct. 22, 2007

(65) Prior Publication Data

US 2008/0117638 A1   May 22, 2008

Related U.S. Application Data

(62) Division of application No. 11/562,416, filed on Nov. 22, 2006, now Pat. No. 7,397,605.

(51) Int. Cl.
*F29V 5/00* (2006.01)

(52) U.S. Cl. .................. 362/628; 362/627; 362/244; 362/246; 362/223; 362/326; 362/329; 362/330

(58) Field of Classification Search ............... 362/627, 362/628, 558, 244, 246, 222, 223, 326, 329, 362/330, 240
See application file for complete search history.

(56) References Cited

U.S. PATENT DOCUMENTS

| 5,851,062 A * | 12/1998 | Shinohara et al. ........... 362/620 |
| 7,404,659 B2 * | 7/2008 | Mai ........................... 362/606 |
| 2002/0057564 A1 * | 5/2002 | Campbell et al. ............ 362/31 |
| 2006/0051048 A1 * | 3/2006 | Gardiner et al. ............ 385/146 |
| 2006/0109687 A1 * | 5/2006 | Campbell ................... 362/627 |

* cited by examiner

*Primary Examiner*—Laura Tso
(74) *Attorney, Agent, or Firm*—Leong C. Lei

(57) ABSTRACT

An optic film has a surface on which a plurality of rib-like micro light guides is formed. Each light guide includes a plurality of ridges, which are of different height and shows variation of height. Either a high ridge or a low ridge of the light guide is made a continuous left-and-right wavy configuration and/or a continuous up-and-down height-variation configuration. Thus, light transmitting through the optic film and converged by the light guides leaves the optic film in a form that is not very regular so as to facilitate subsequent use of the light in for example a liquid crystal display panel.

4 Claims, 32 Drawing Sheets

STRUCTURE OF OPTIC FILM

CROSS-REFERENCE

This is a division of application Ser. No. 11/562,416, filed on Nov. 22, 2006 now U.S. Pat. No. 7,397,605.

BACKGROUND OF THE INVENTION (a) Technical Field of the Invention

The present invention relates to an optic film, and in particular to a structure of optic film that allows light transmitting therethrough to leave in an irregular manner to facilitate subsequent use of the light.

(b) Description of the Prior Art

A conventional backlight module provides a light source wherein light transmits through prism ribs formed on an optic film and thus proceeds in a very regular straight beam. The conventional backlight module, although effectively converting a linear light source into a surface light source, makes light transmitting through the prism ribs formed on the film so that the light proceeds ahead in a regular straight beam. On the other hand, a liquid crystal display panel comprises thin-film transistors and color filters which are of minute matrix arranged in an opposing manner. Thus, when the regular straight beam passes through gaps between units of thin-film transistors and the color filters, diffraction of light occurs, which forms interference patterns in the liquid crystal display panel.

Occurrence of the interference patterns in a specific liquid crystal panel cannot be identified in the site of backlight module manufacturers, and can only be found when a liquid crystal panel in which the backlight module is mounted is actuated. This often causes problems between the backlight module suppliers and the manufacturers of liquid crystal display panels, and is a trouble of pressing need to be overcome.

Therefore, it is desired to provide an optic film for a backlight module that overcomes the problems discussed above.

SUMMARY OF THE INVENTION

The primary purpose of the present invention is to provide an optic film having a surface on which a plurality of micro light guides is formed, wherein the light guide comprises at least two ridges of identical height, and a first number of the ridges of the light guide are of a continuous left-and-right wavy configuration, while a second number of the ridges are of a straight linear configuration.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
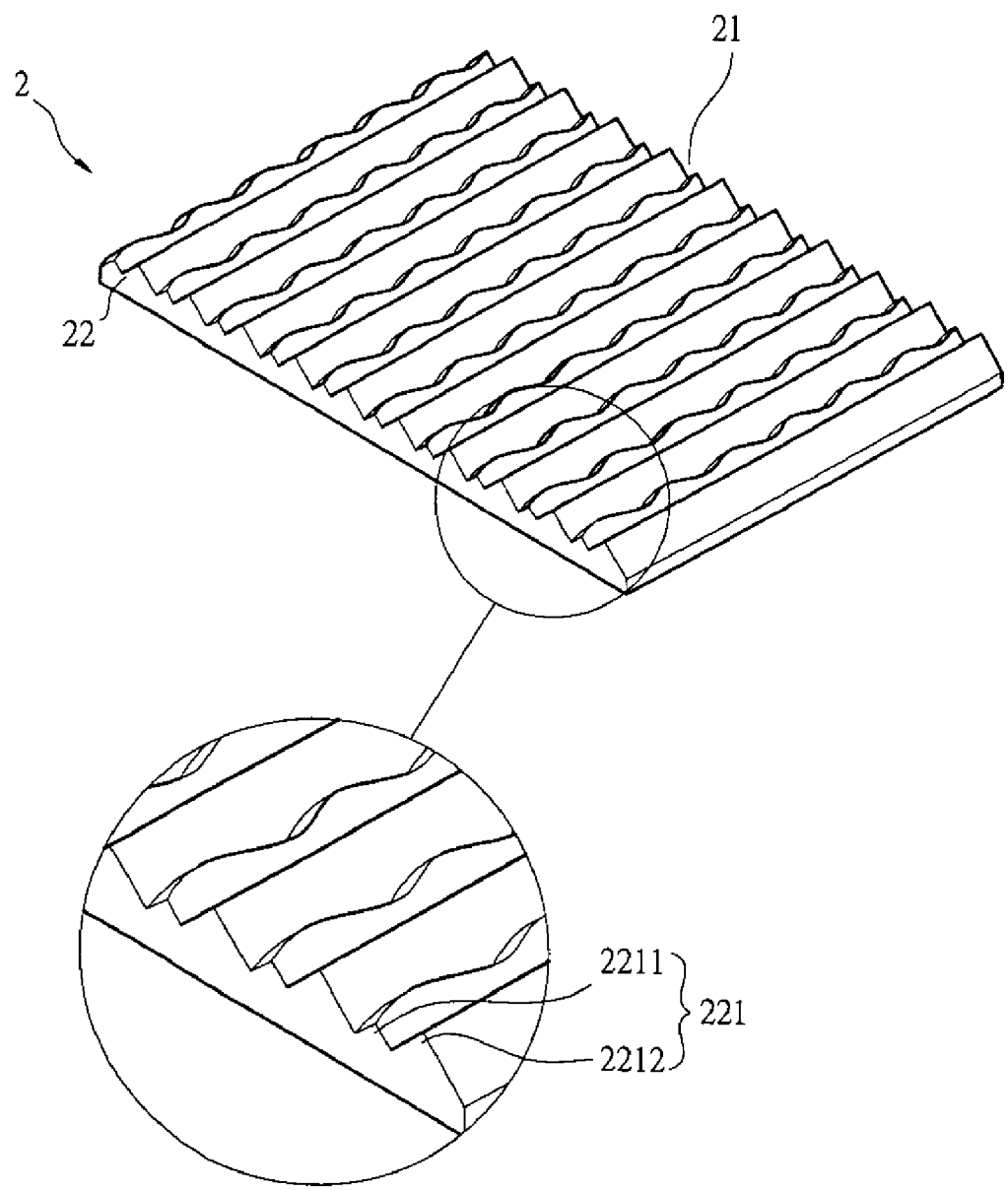
FIG. 1 shows a perspective view of an optic film constructed in accordance with a first embodiment of the present invention.

With reference to the drawings and in particular to FIG. 1, an optic film constructed in accordance with the present invention, generally designated with reference numeral 2, is made of material that has excellent light transmittance. The optic film 2 has a surface 21 on which a plurality of light guides 22 in the form of micro ribs are formed. The ribs of the light guides 22 can be made of the same material as a body of the optic film 2, or alternatively, the light guides 22 are made of materials different from that making the body of the optic film 2. Each light guide 22 comprises at least two ridges 221, of which the number is taken as two for illustration of the present embodiment. The ridges 221 of the light guide 22 are of different heights with respect to the body of the optic film 2, whereby the ridges 221 of the light guide 22 include a low ridge 2211 and a high ridge 2212.

Figure 2:
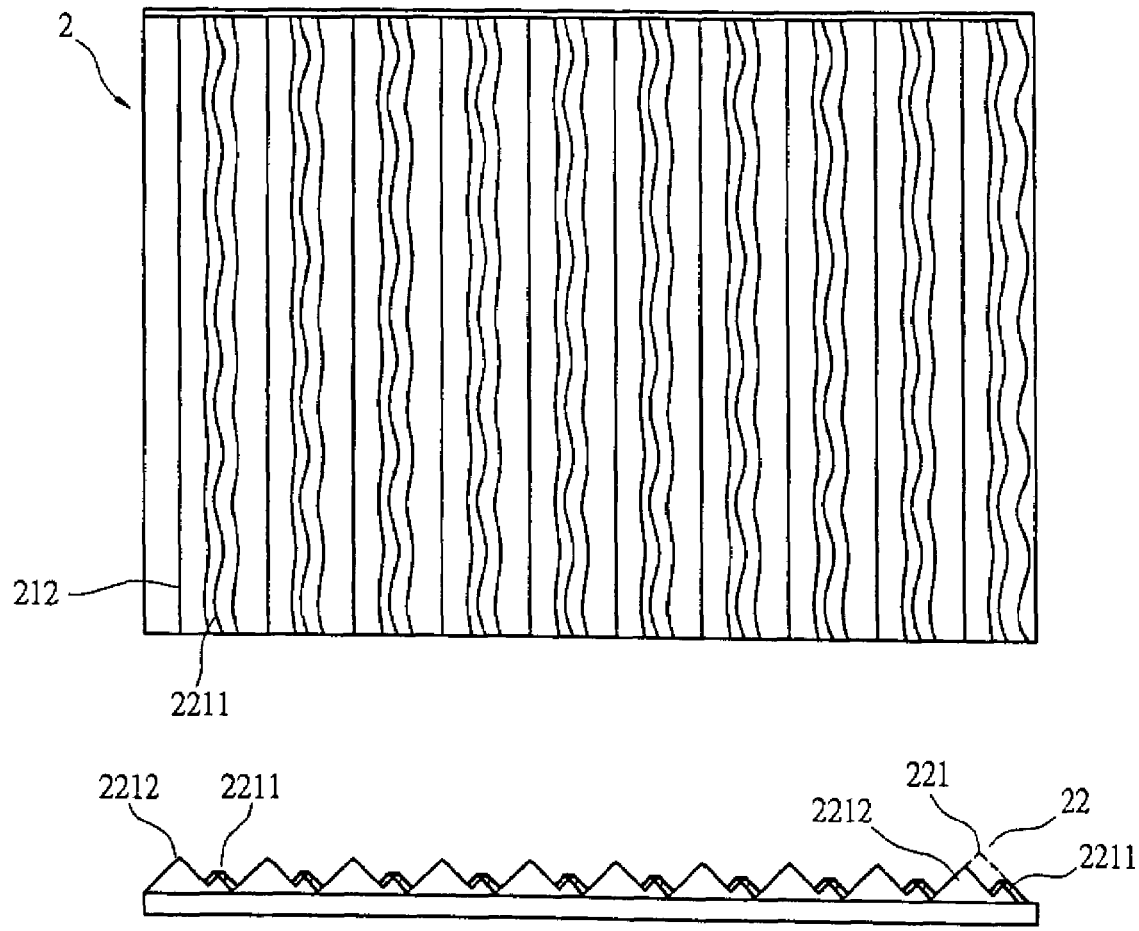
FIG. 2 shows a top plan view and an end view of the optic film of FIG. 1.
Figure 3:
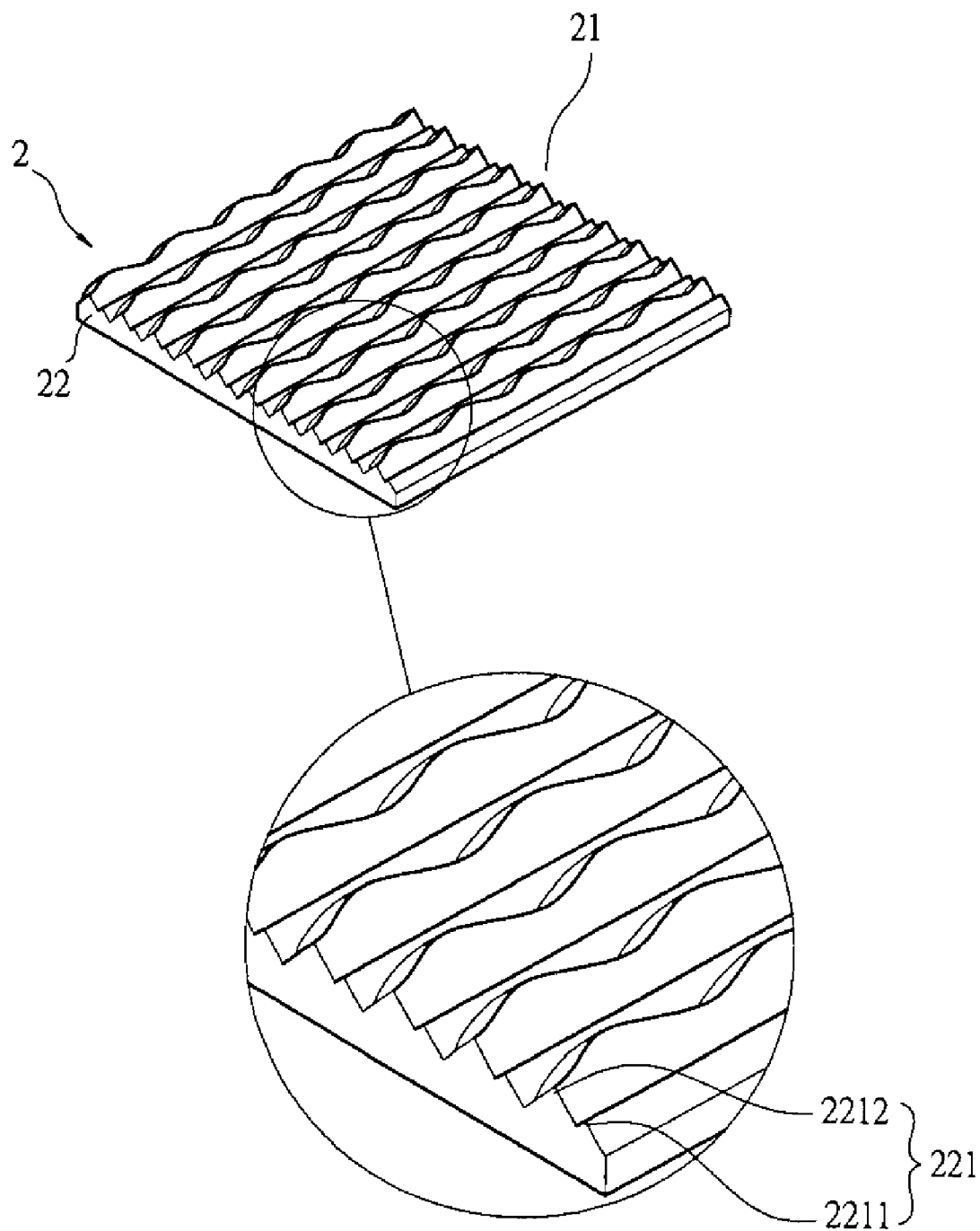
FIG. 3 shows a perspective view of an optic film constructed in accordance with a second embodiment of the present invention.
Figure 4:
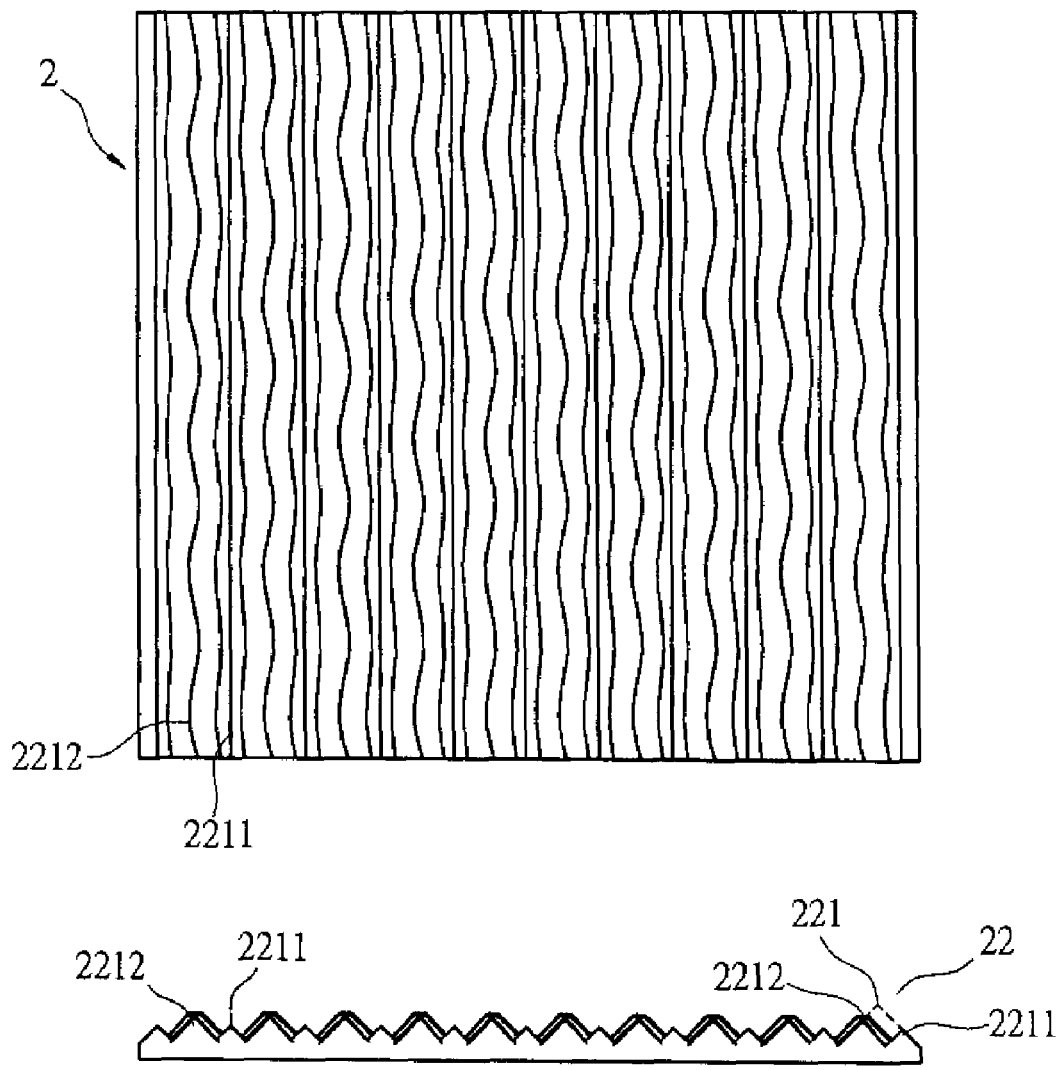
FIG. 4 shows a top plan view and an end view of the optic film of FIG. 3.
Figure 5:
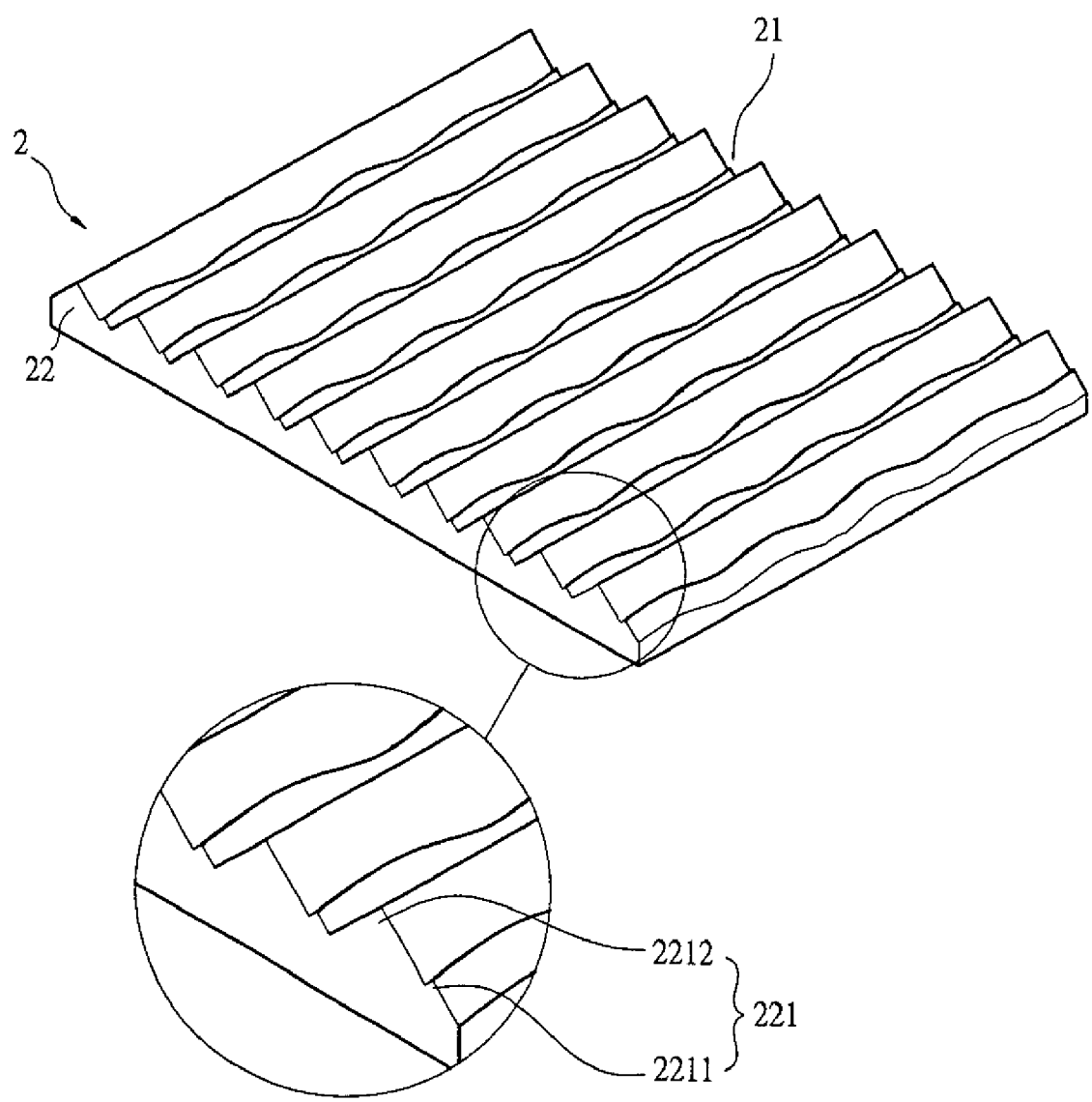
FIG. 5 shows a perspective view of an optic film constructed in accordance with a third embodiment of the present invention.
Figure 6:
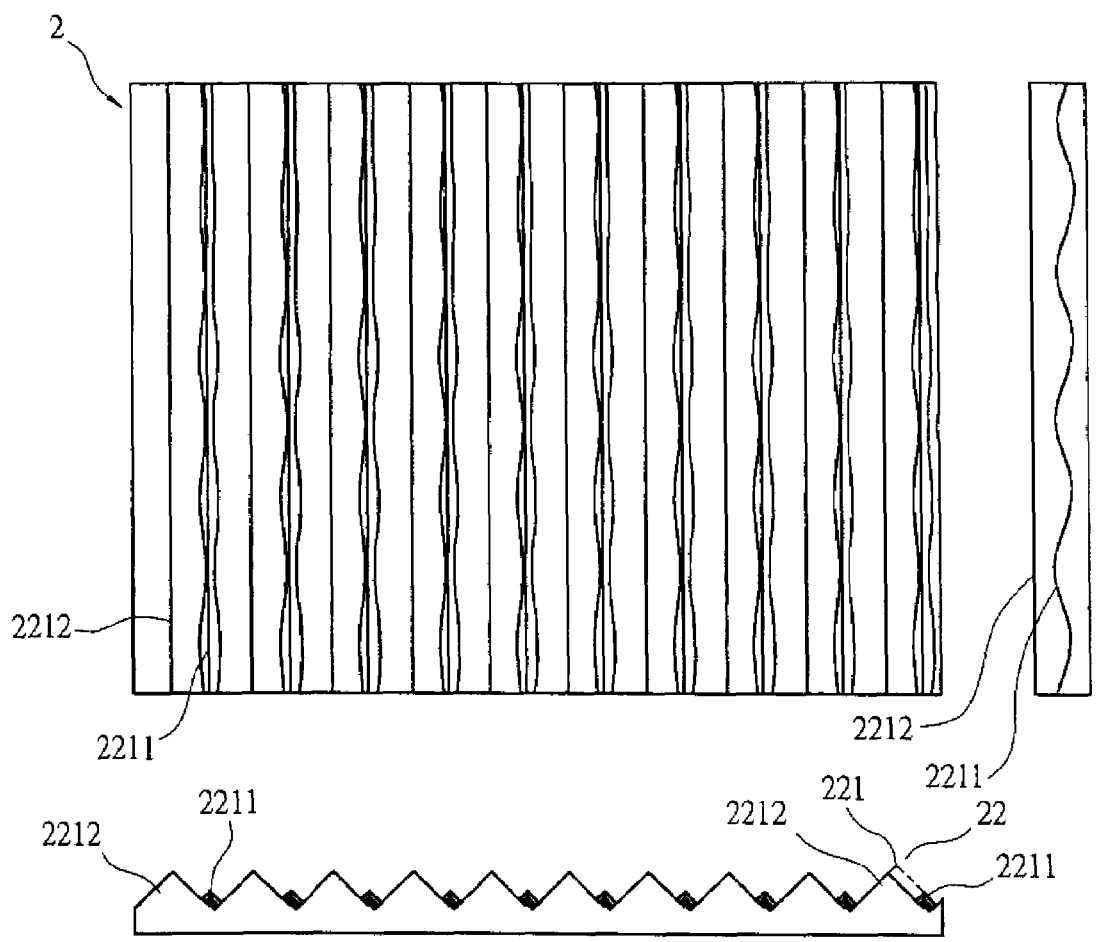
FIG. 6 shows a top plan view, an end view, and a side elevational view of the optic film of FIG. 5.
Figure 7:
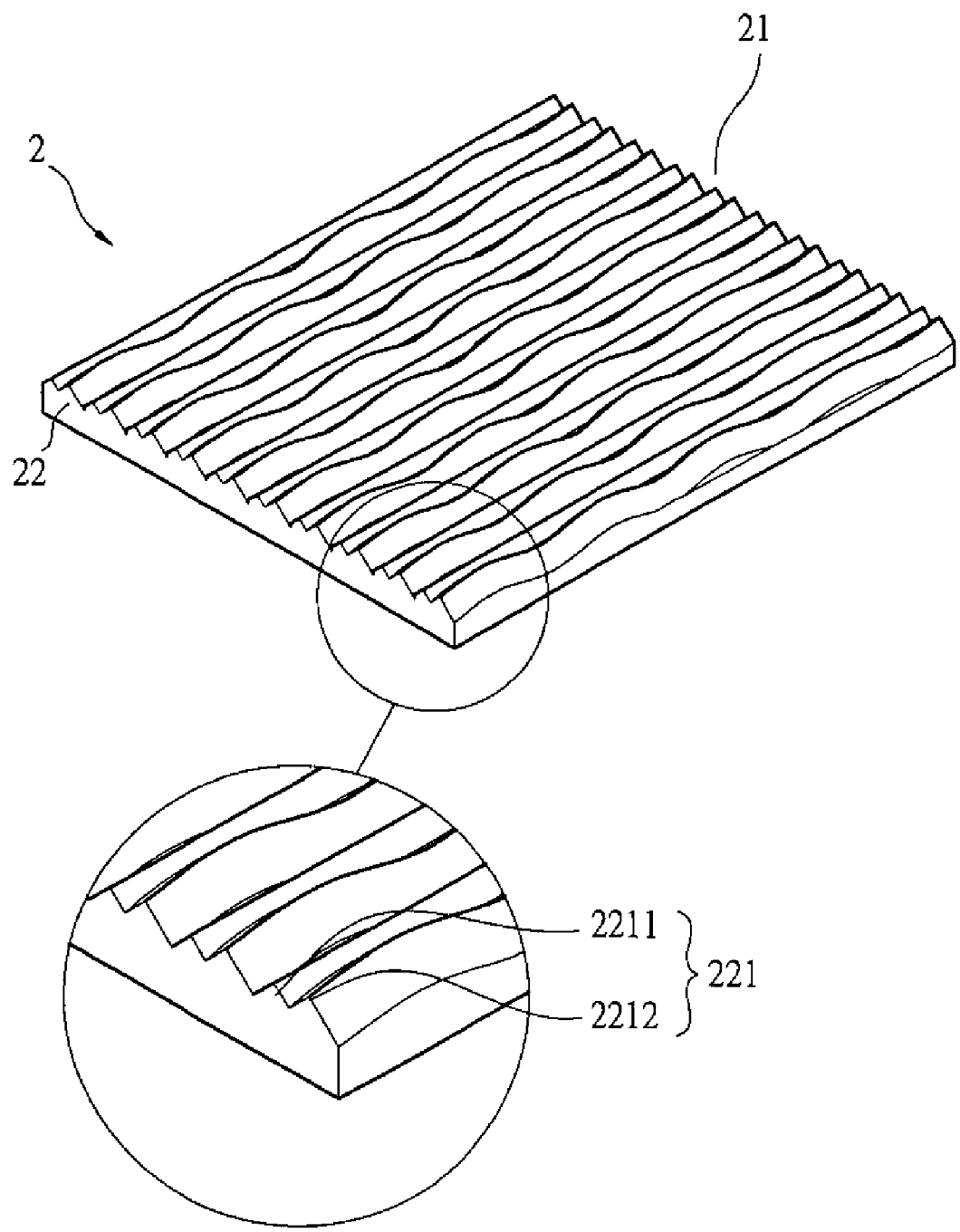
FIG. 7 shows a perspective view of an optic film constructed in accordance with a fourth embodiment of the present invention.
Figure 8:
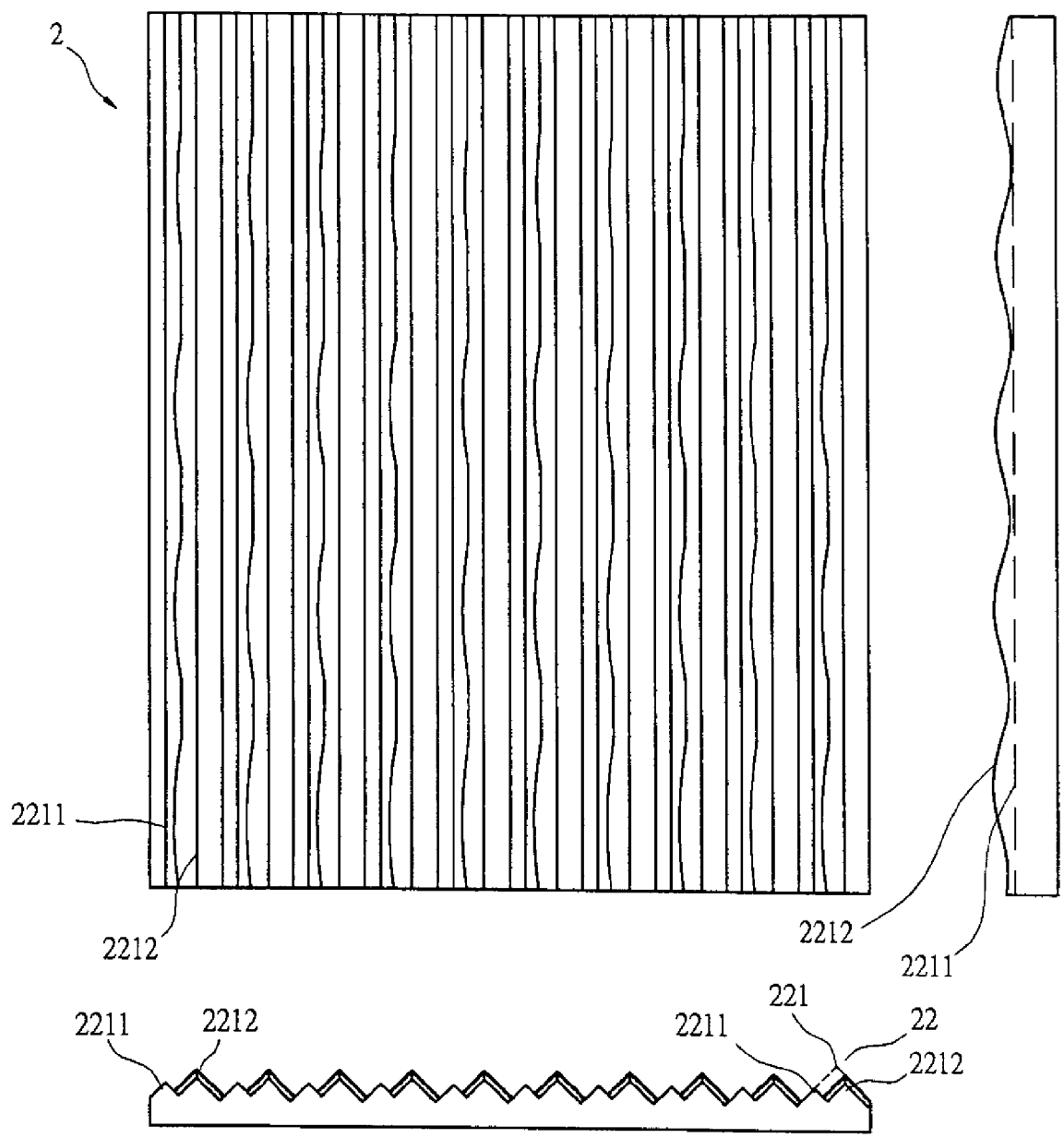
FIG. 8 shows a top plan view, an end view, and a side elevational view of the optic film of FIG. 7.
Figure 9:
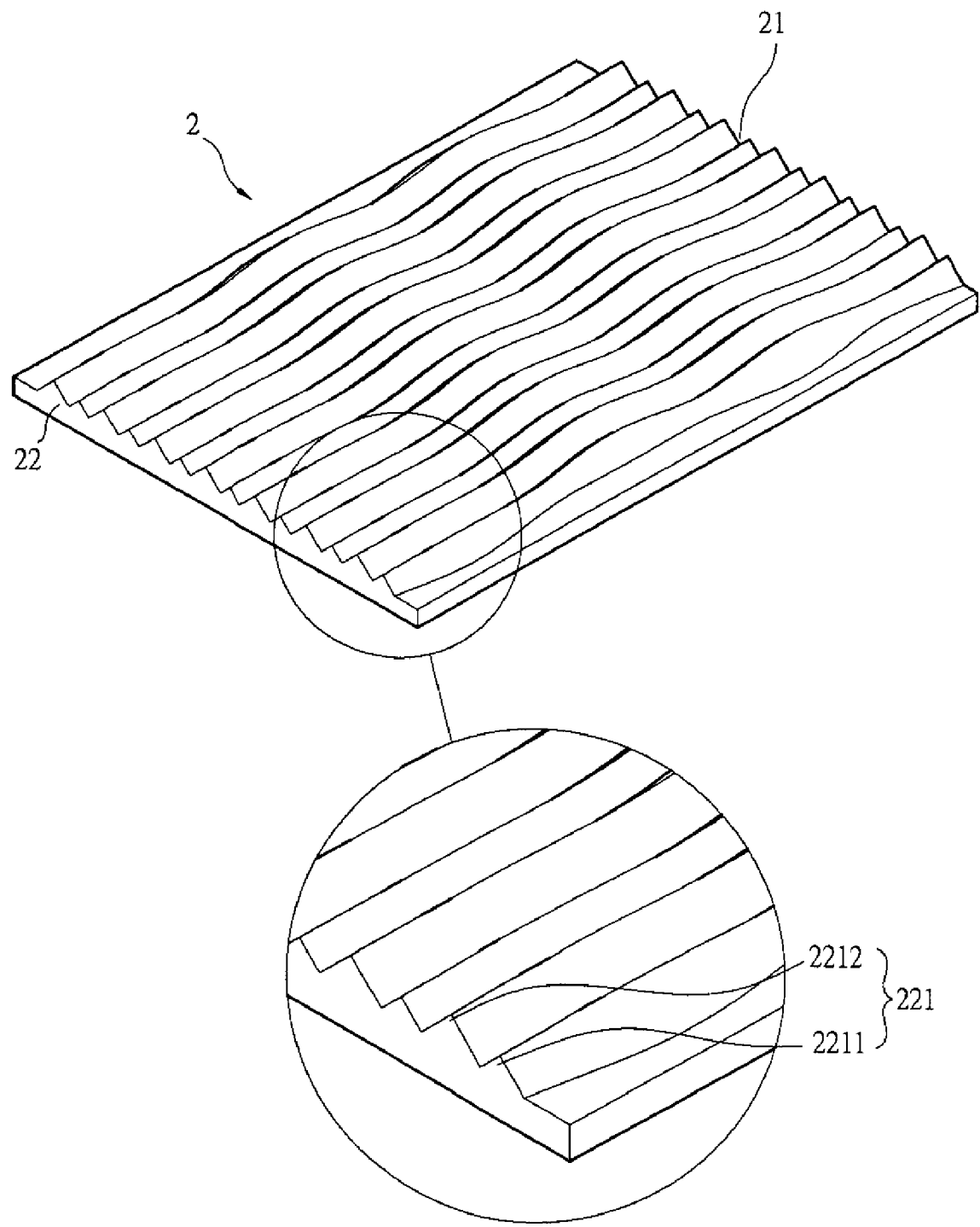
FIG. 9 shows a perspective view of an optic film constructed in accordance with a fifth embodiment of the present invention.
Figure 10:
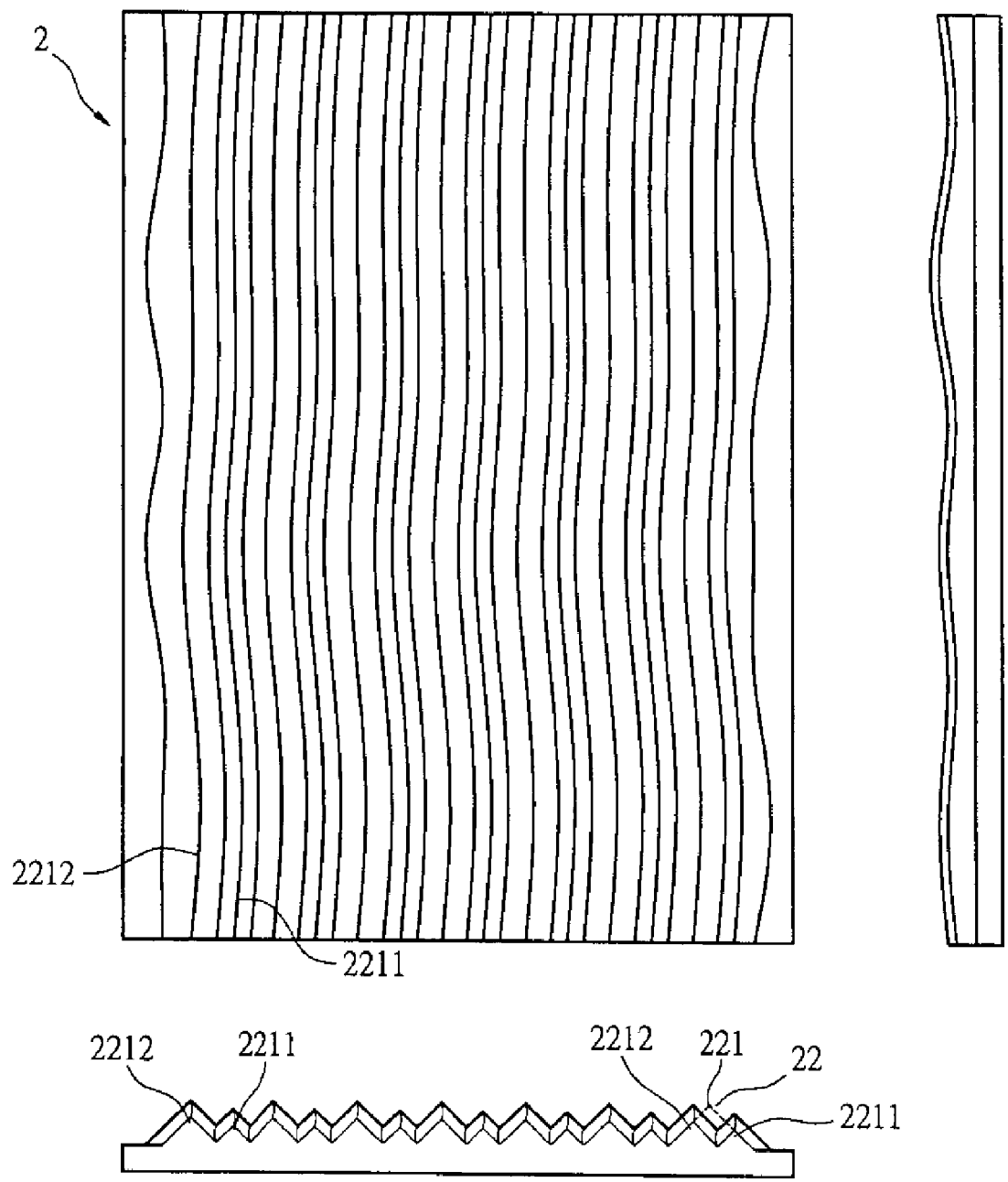
FIG. 10 shows a top plan view, an end view, and a side elevational view of the optic film of FIG. 9.
Figure 11:
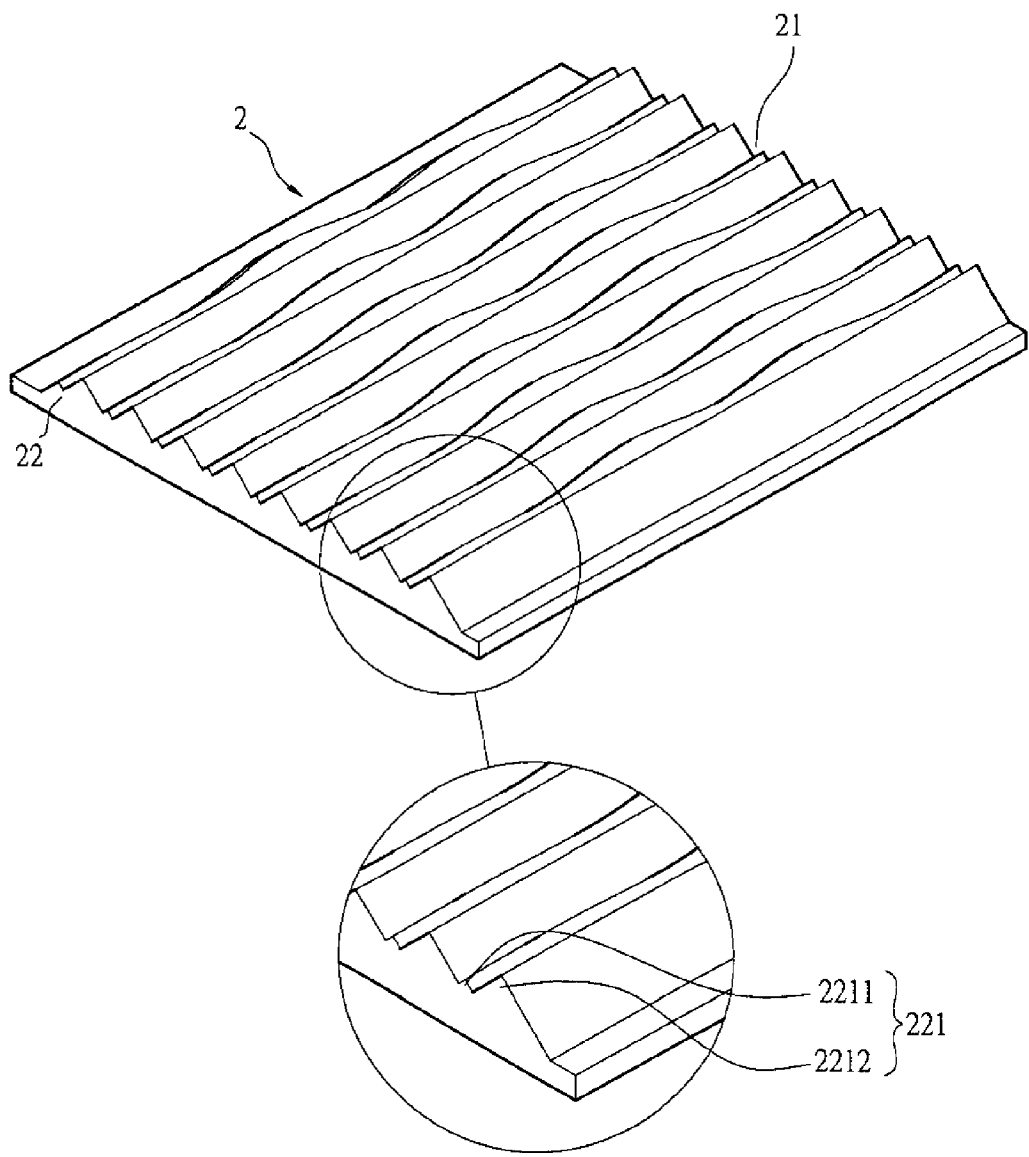
FIG. 11 shows a perspective view of an optic film constructed in accordance with a sixth embodiment of the present invention.
Figure 12:
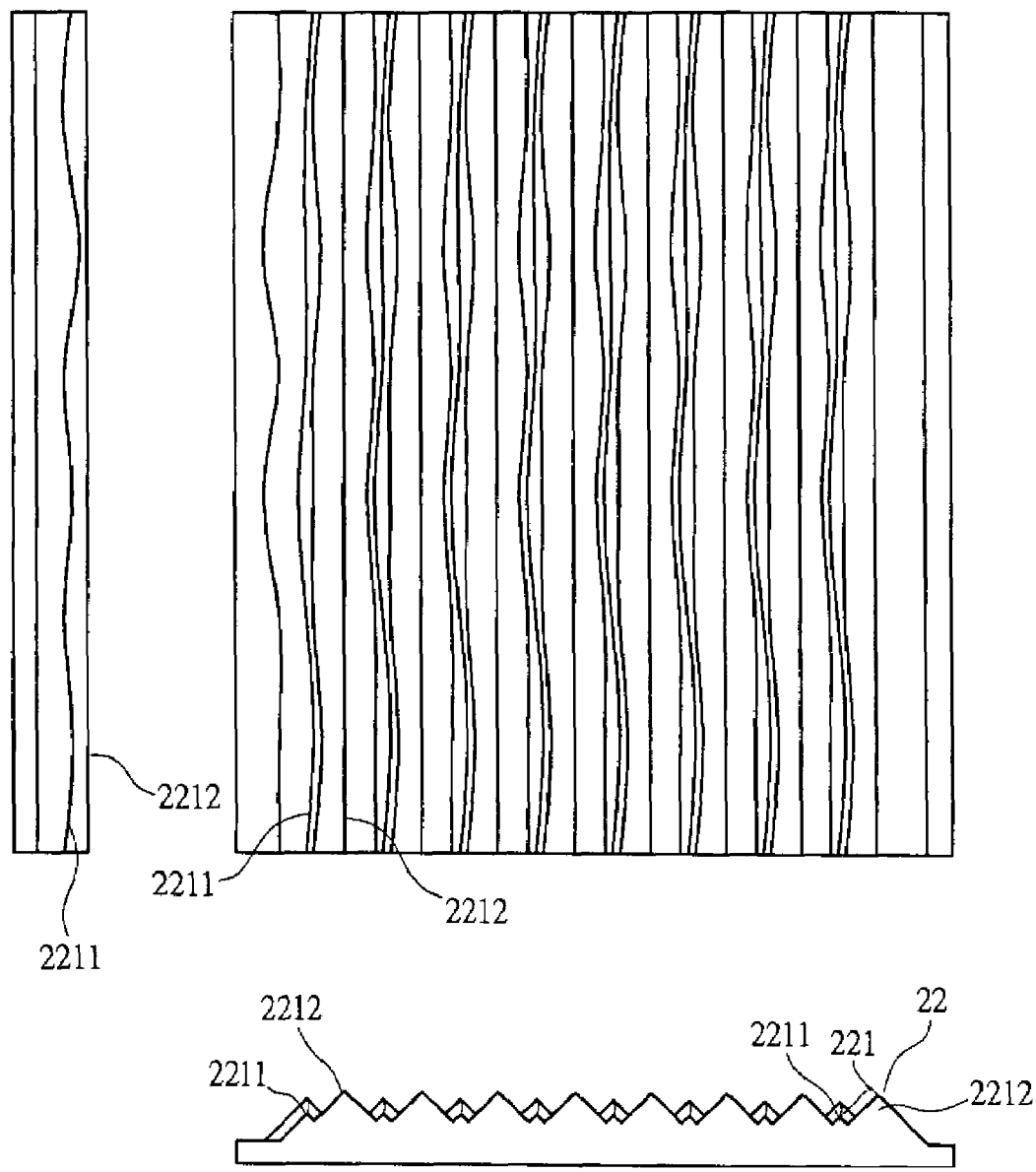
FIG. 12 shows a top plan view, an end view and a side elevational view of the optic film of FIG. 11.

Also referring to FIG. 2, in accordance with the present invention, the ridges 221 of the light guide 22 are of different heights, and thus the ridges 221 are divided into a low ridge 2211 and a high ridge 2212. As shown in FIGS. 1-4, either the low ridge 2211 or the high ridge 2212 of the light guide 22 or both are of a continuous left-and-right wavy configuration. As such, when light transmits through the optic film 2, the continuous left-and-right wavy configuration of the low ridge 2211 (or the high ridge 2212) causes the light that transmits through and that is converged by the light guide 22 to leave the light guide 22 in a non-straight linear beam, and contains variations caused by curving. Thus, the light beam passing through the optic film 2 is not in a regular form, which prevents the light from inducing refraction when the light passes through thin-film transistors and color filters of a liquid crystal display panel whereby no interference pattern will occur in image displaying by the liquid crystal display panel.

Referring to FIGS. 5-8, in accordance with another embodiment of the present invention, the low ridge 2211 or the high ridge 2212 of the light guide 22 or both are made a continuous up-and-down height-variation configuration. As such, when light transmits through the optic film 2, the continuous up-and-down wavy configuration of the low ridge 2211 or the high ridge 2212 of the light guide 22 can similarly make the light beam that is converged by the light guide 22 irregular so that the light induces no interference pattern in a liquid crystal display panel when the light passes through thin-film transistors and color filters of the liquid crystal display panel.

Figure 13:
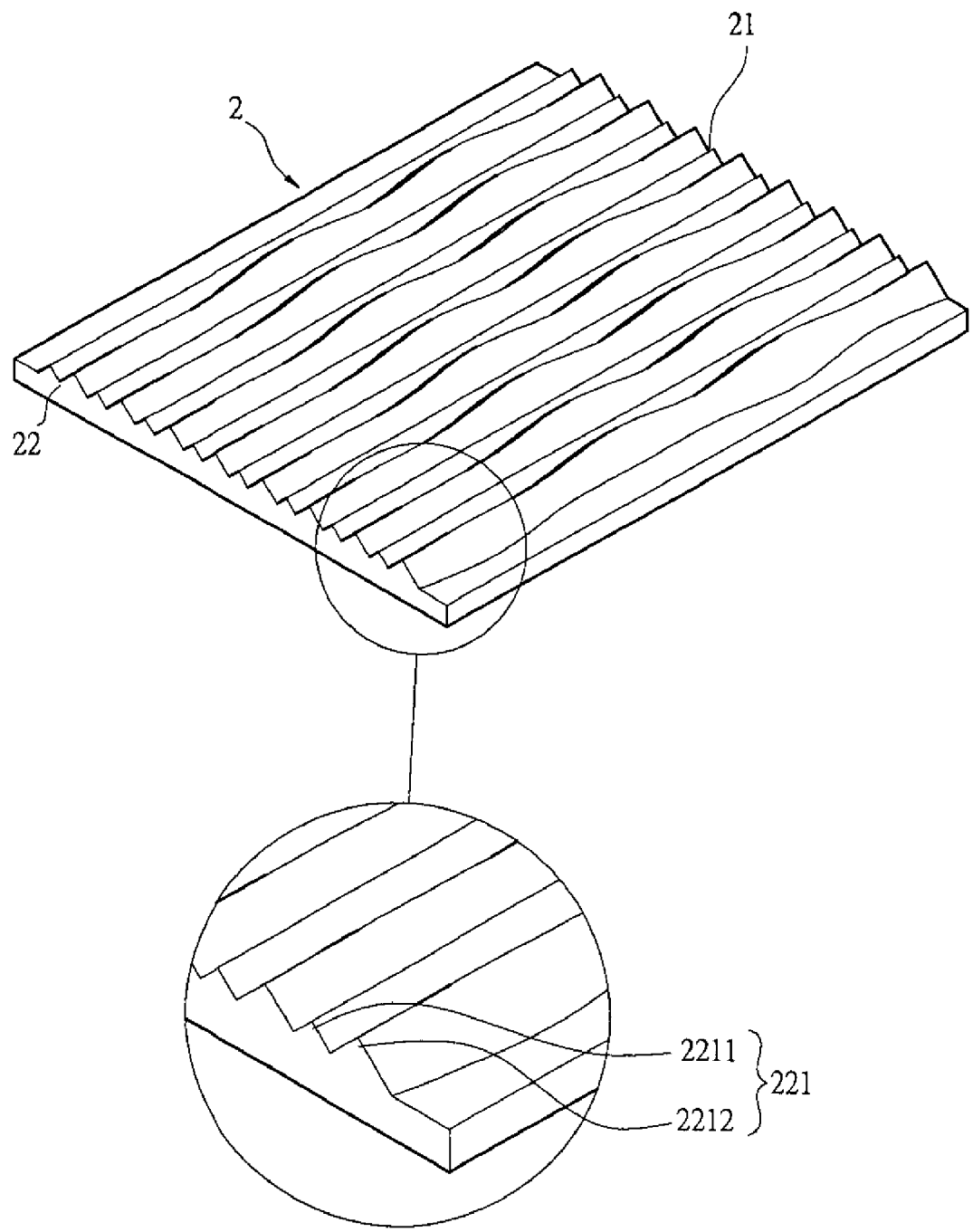
FIG. 13 shows a perspective view of an optic film constructed in accordance with a seventh embodiment of the present invention.
Figure 14:
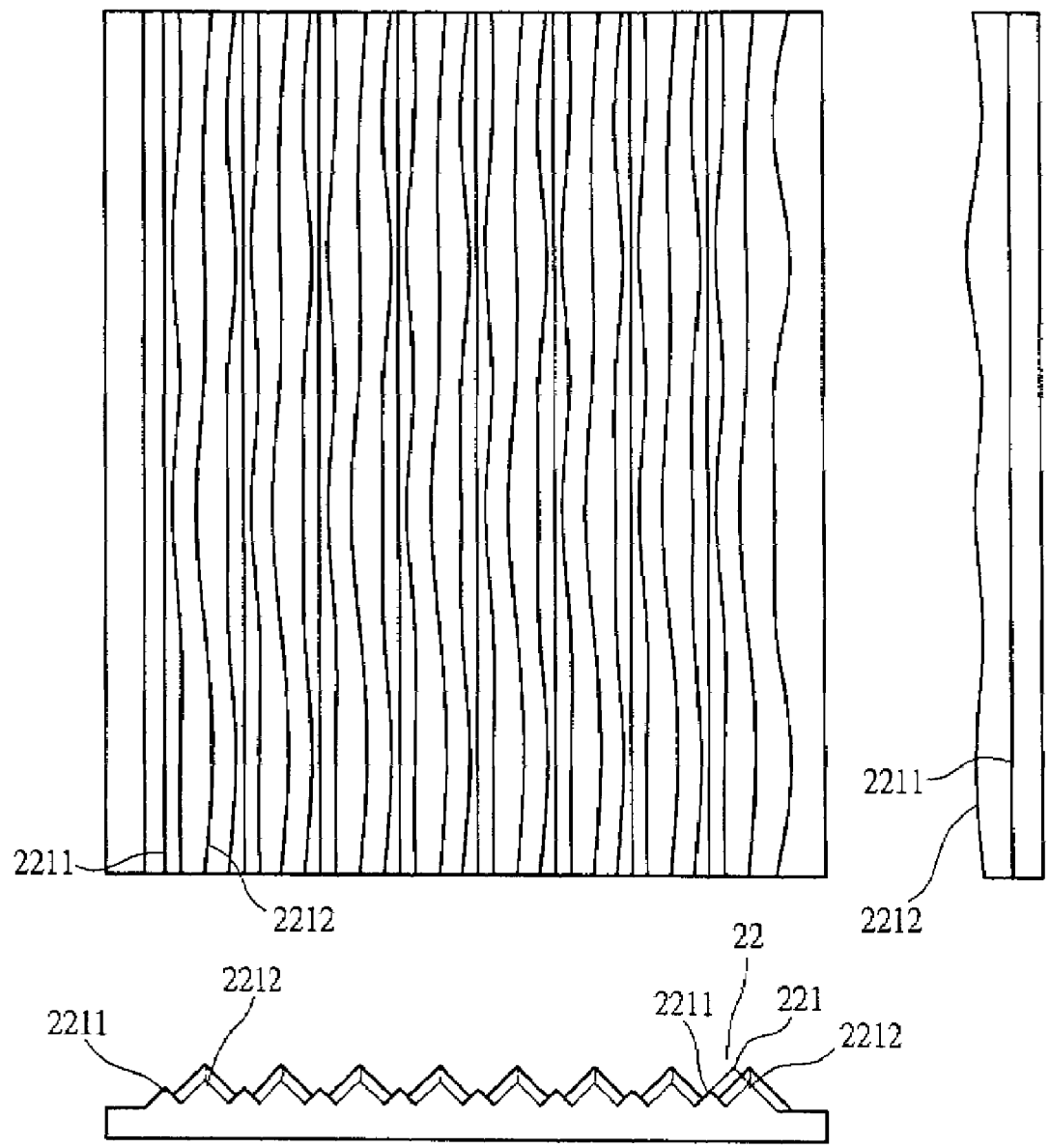
FIG. 14 shows a top plan view, an end view, and a side elevational view of the optic film of FIG. 13.

Referring to FIGS. 9-12, in accordance with a further embodiment of the present invention, the low ridge 2211 or the high ridge 2212 of the light guide 22 is made a continuous up-and-down height-variation and left-and-right wavy configuration, as best seen in FIGS. 13 and 14. As such, when light transmits through the optic film 2, the continuous up-and-down height-variation and left-and-right wavy configuration of the low ridge 2211 or the high ridge 2212 of the light guide 22 makes the light beam that is converged by the light guide 22 irregular so that the light induces no interference pattern in a liquid crystal display panel when the light passes through thin-film transistors and color filters of the liquid crystal display panel.

Figure 15:
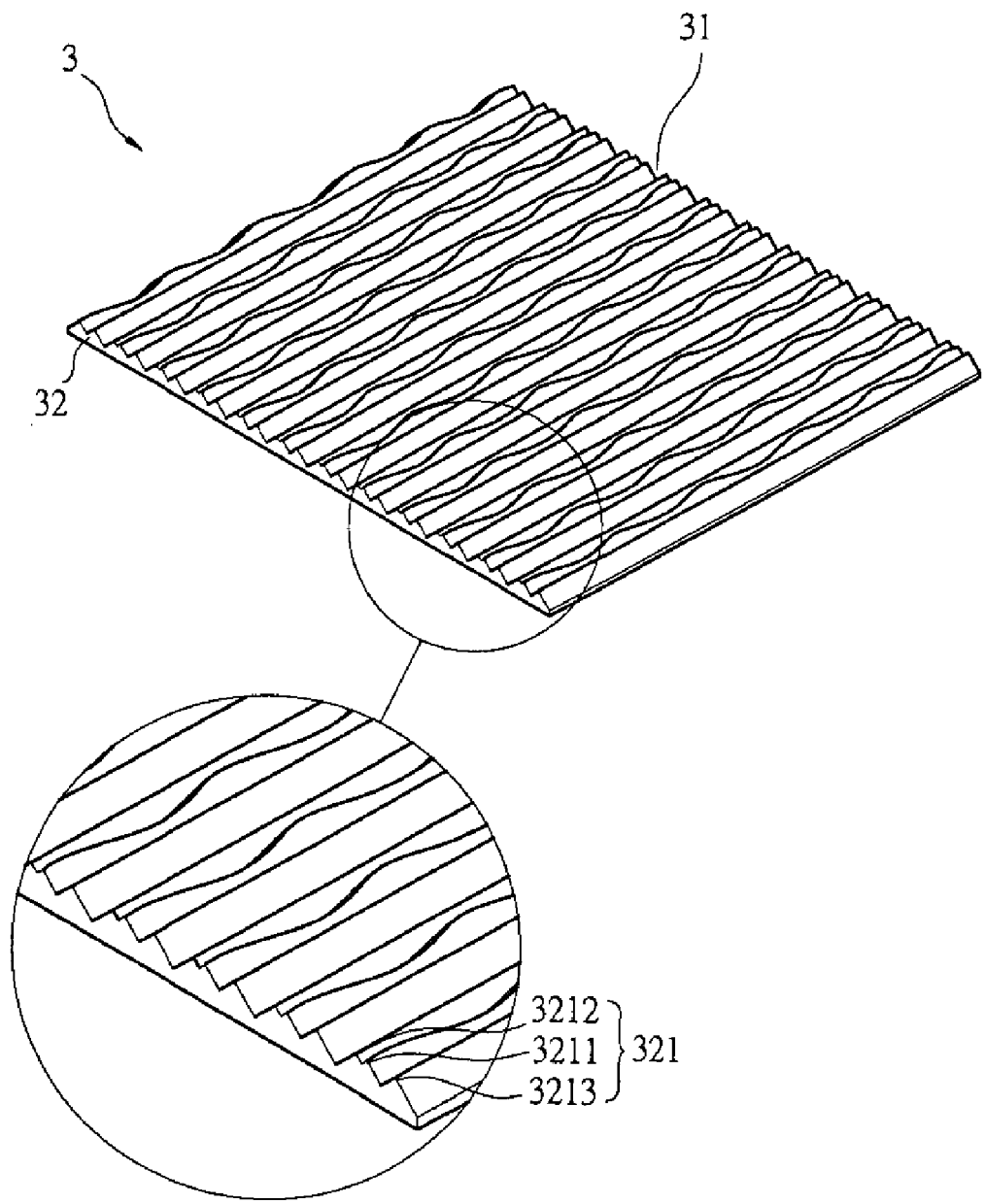
FIG. 15 shows a perspective view of an optic film constructed in accordance with an eighth embodiment of the present invention.
Figure 16:
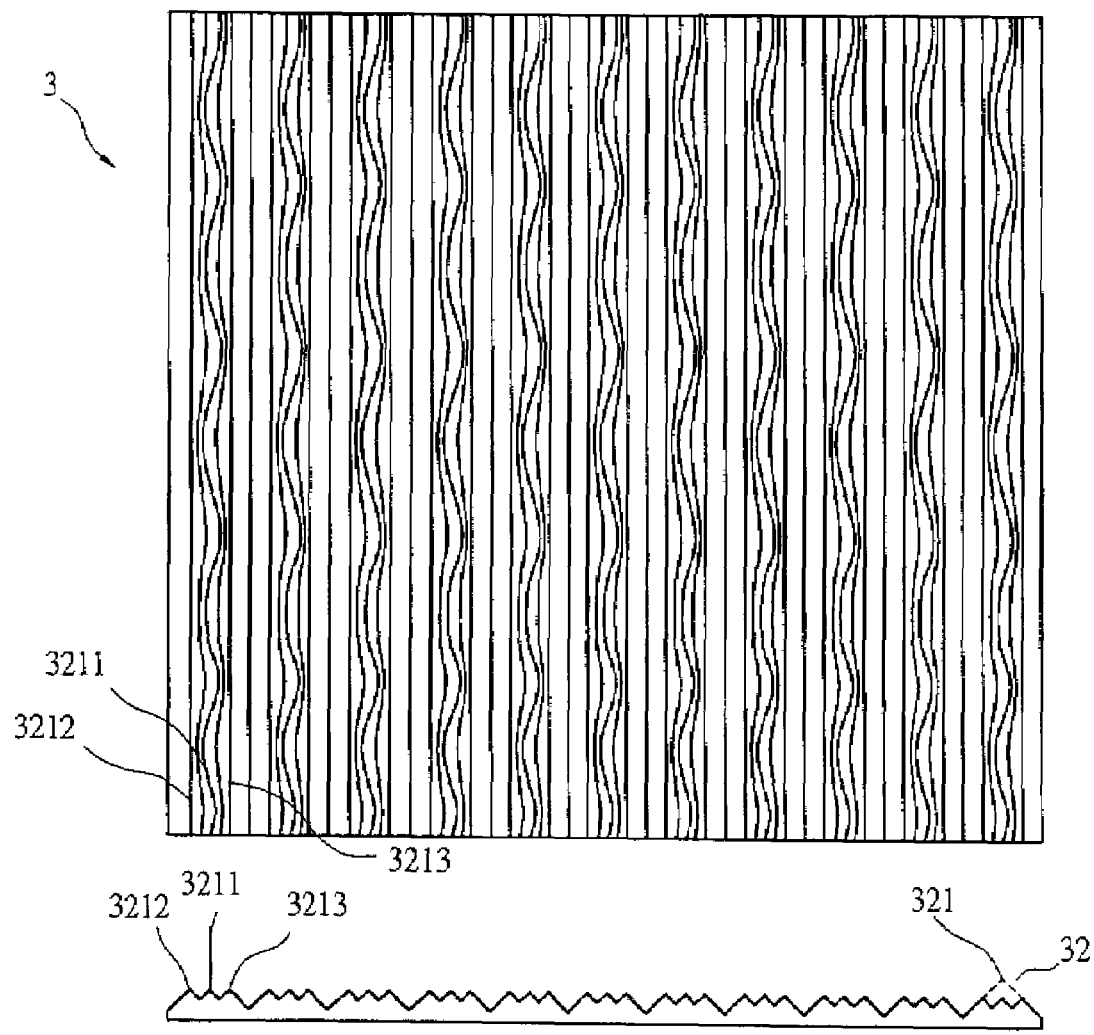
FIG. 16 shows a top plan view and an end view of the optic film of FIG. 15.

Referring to FIGS. 15 and 16, in accordance with a further embodiment of the present invention, an optic film 3 has a surface 31 on which a plurality of light guides 32 in the form of micro ribs are formed. Each light guide 32 comprises at least two ridges 321, of which the number is taken as three for illustration of the present embodiment. All the ridges 321 of the light guide 32 are of substantially identical height and all or some of the ridges 321 of the light guide 32 have a variable configuration, wherein for example, a central ridge 3211 of the light guide 32 has a left-and-right wavy configuration, while two side ridges 3212, 3213 are of straight linear configuration. As such, when light transmits through the optic film 3, the continuous left-and-right wavy configuration of the central ridge 3211 of the light guide 32 makes the light beam that is converged by the light guide 32 irregular so that the light induces no interference pattern in a liquid crystal display panel when the light passes through thin-film transistors and color filters of the liquid crystal display panel.

Figure 17:
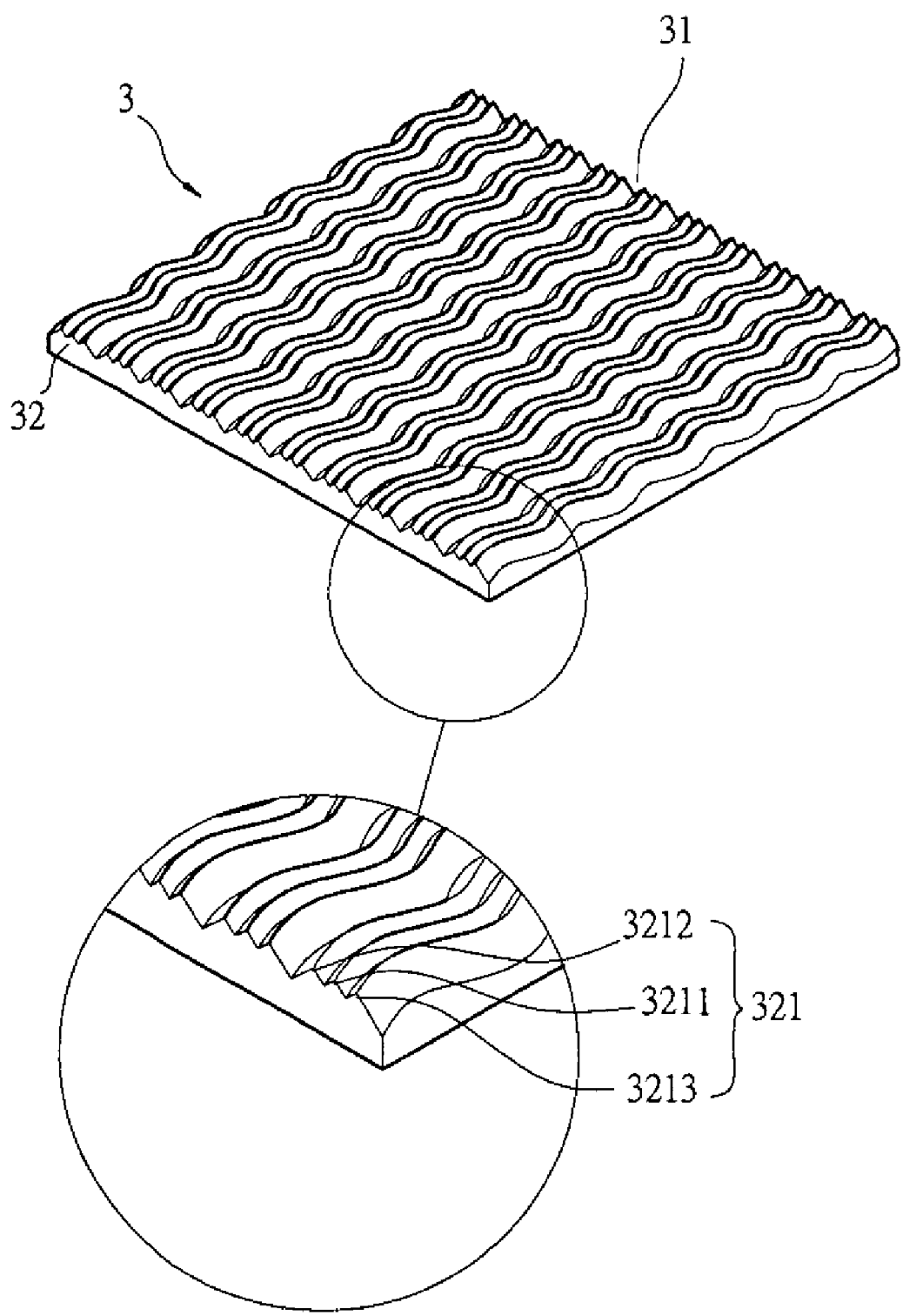
FIG. 17 shows a perspective view of an optic film constructed in accordance with a ninth embodiment of the present invention.
Figure 18:
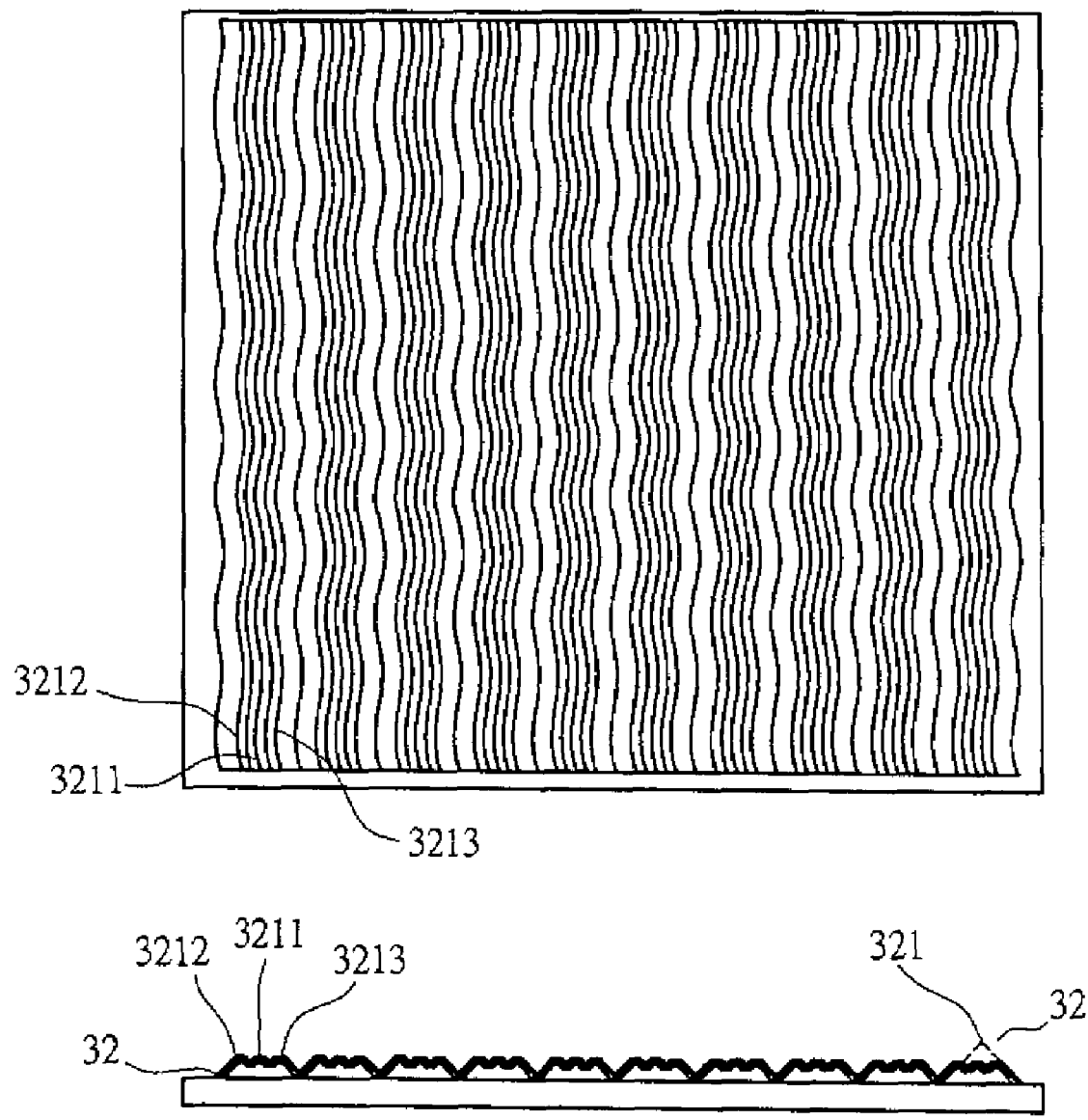
FIG. 18 shows a top plan view and an end view of the optic film of FIG. 17.

Referring to FIGS. 17 and 18, in accordance with a further embodiment of the present invention, a central ridge 3211 of the light guide 32 of the optic film 3 is made a straight linear configuration, while side ridges 3212, 3213, which are on opposite sides of the central ridge 3211, are made a continuous left-and-right wavy configuration. As such, light transmitting through the optic film 3 can be of variations, so that the light induces no interference pattern in a liquid crystal display panel when the light passes through thin-film transistors and color filters of the liquid crystal display panel.

Figure 19:
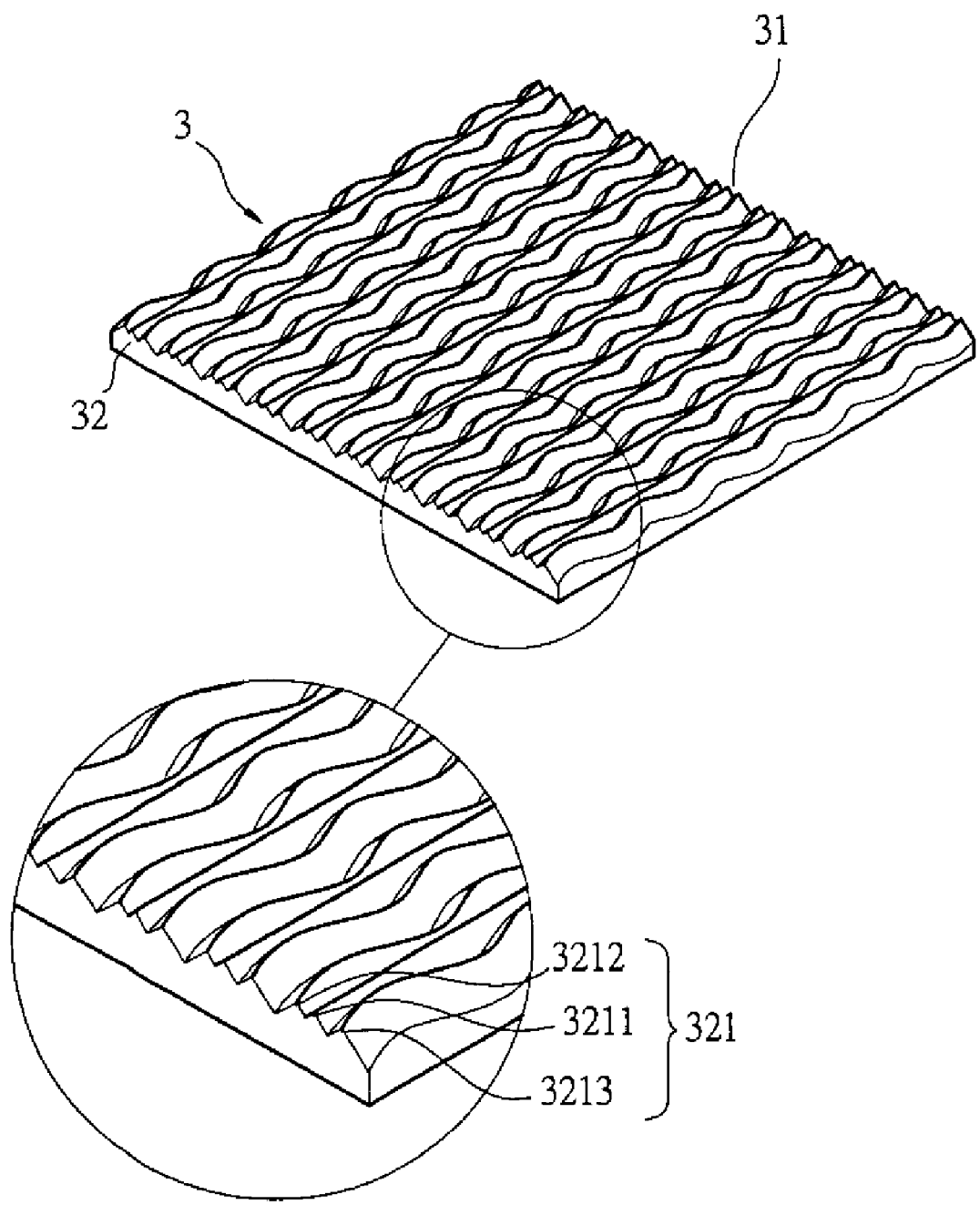
FIG. 19 shows a perspective view of an optic film constructed in accordance with a tenth embodiment of the present invention.
Figure 20:
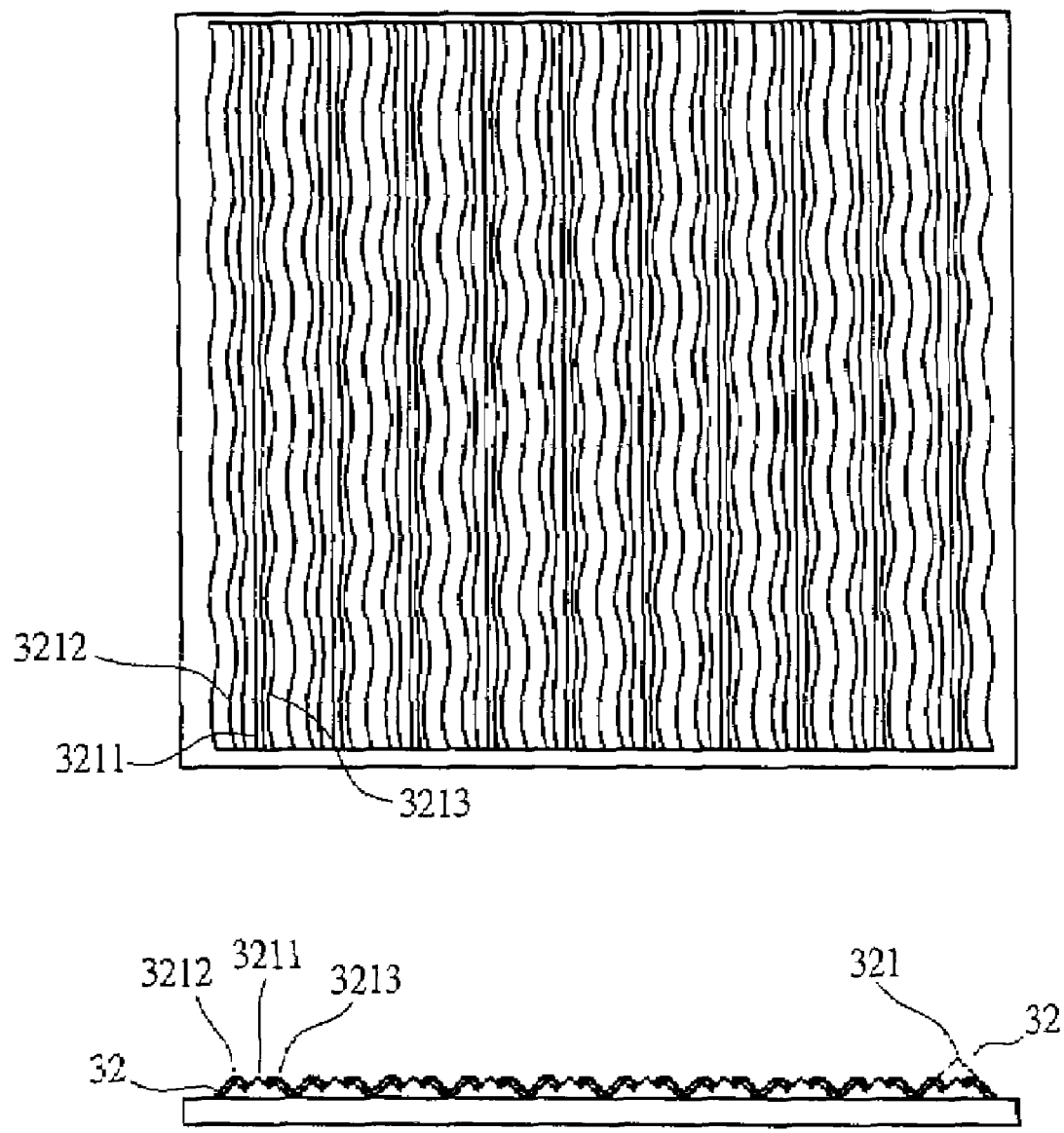
FIG. 20 shows a top plan view and an end view of the optic film of FIG. 19.

Referring to FIGS. 19 and 20, in accordance with a further embodiment of the present invention, the side ridge 3211, 3212, 3213 of each light guide 32 of the optic film 3 are all made a continuous left-and-right wavy configuration. As such, light transmitting through the optic film 3 can be of versatile variations, so that the light induces no interference pattern in a liquid crystal display panel when the light passes through thin-film transistors and color filters of the liquid crystal display panel.

Figure 21:
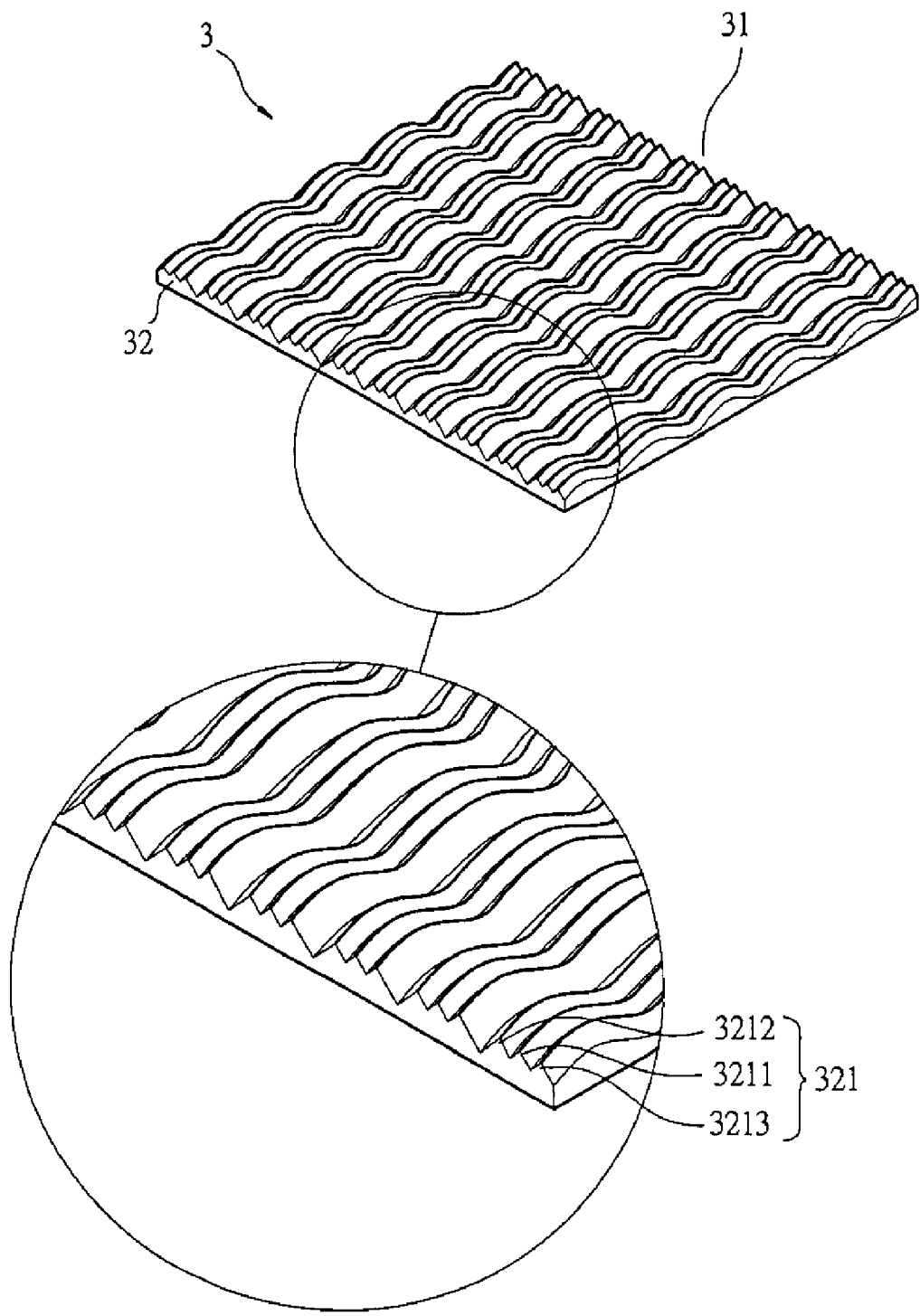
FIG. 21 shows a perspective view of an optic film constructed in accordance with an eleventh embodiment of the present invention.
Figure 22:
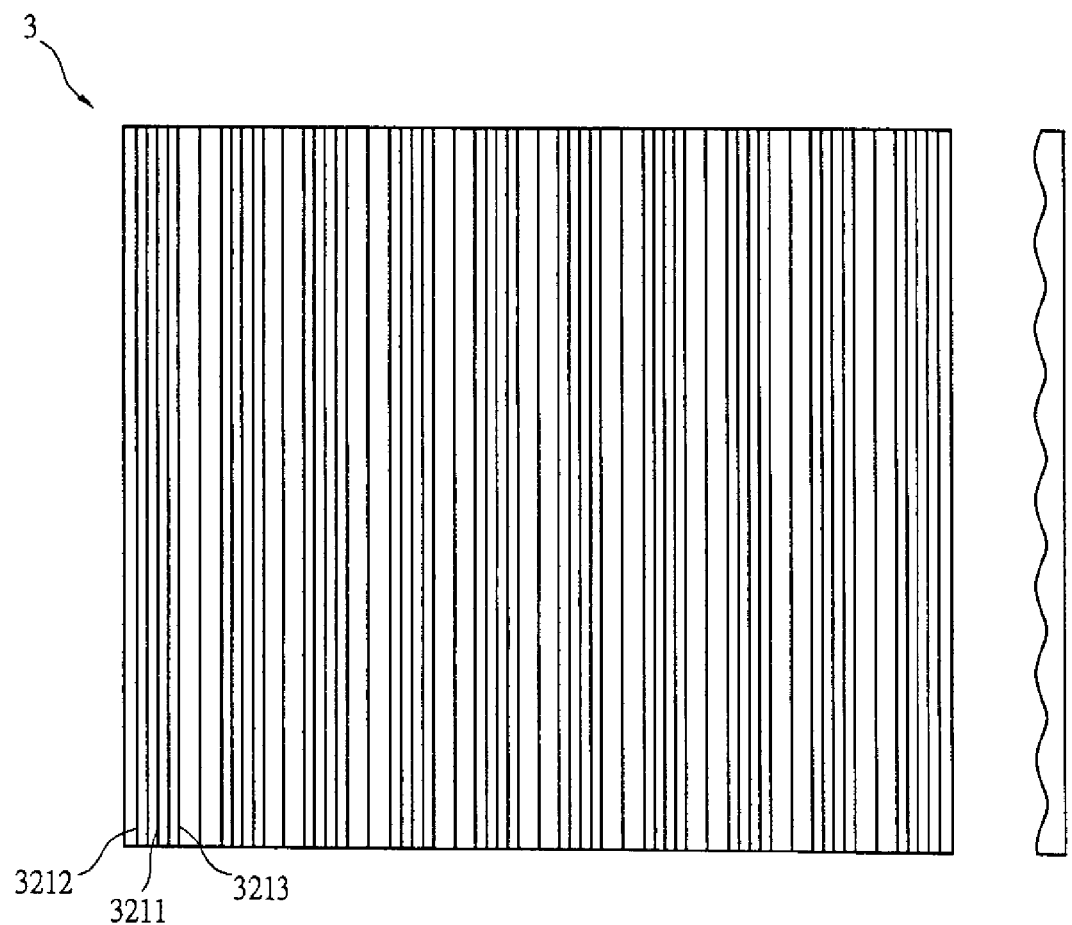
FIG. 22 shows a top plan view and a side elevational view of the optic film of FIG. 21.

Referring to FIGS. 21 and 22, in accordance with a further embodiment of the present invention, the ridge 3211, 3212, 3213 of each light guide 32 of the optic film 3 are all made a continuous up-and-down height-variation configuration. As such, light transmitting through the optic film 3 can be of variations caused by the continuous up-and-down variation of heights of the ridges 3211, 3212, 3213 of the light guide 32, so that the light induces no interference pattern in a liquid crystal display panel when the light passes through thin-film transistors and color filters of the liquid crystal display panel.

Figure 23:
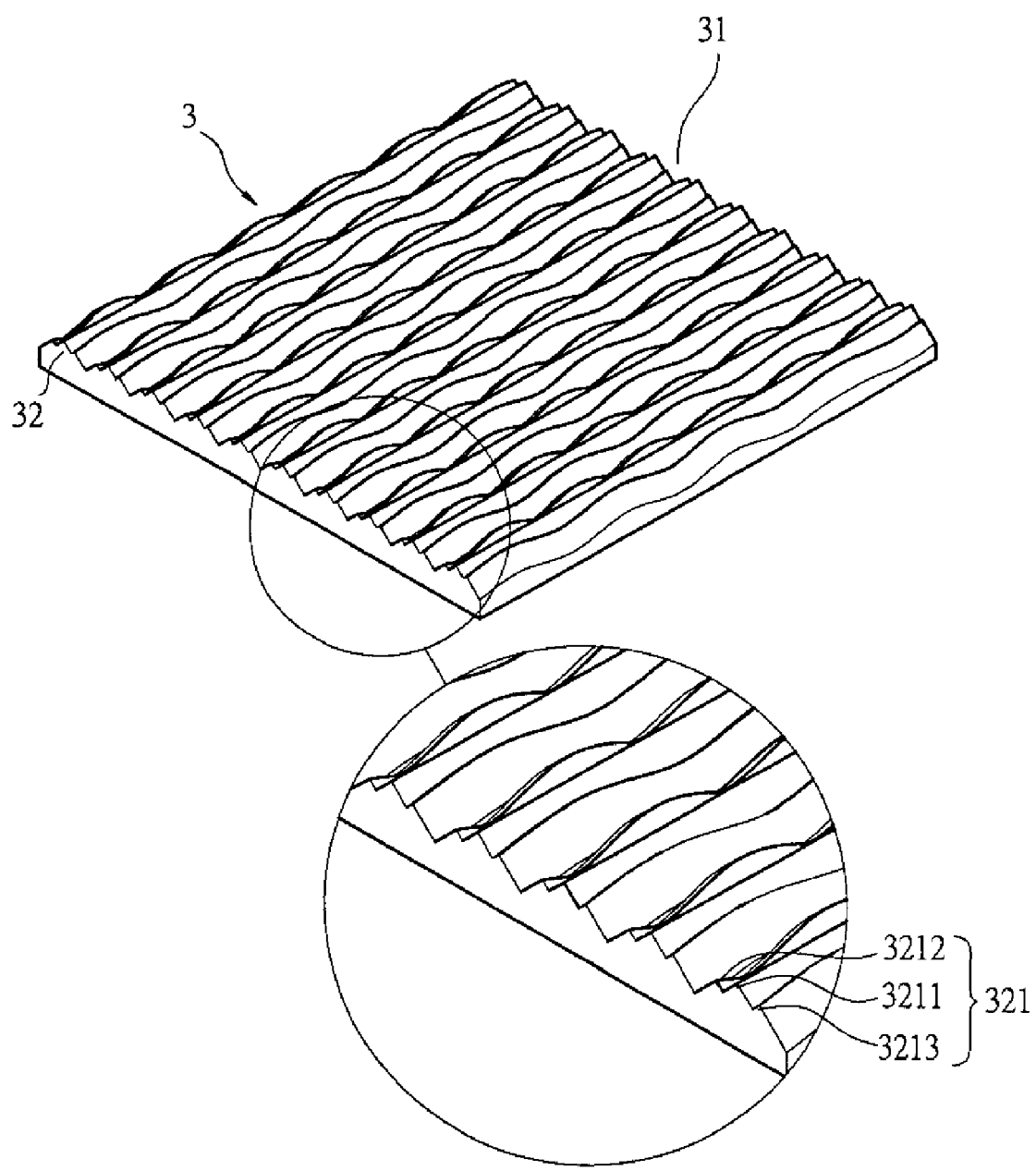
FIG. 23 shows a perspective view of an optic film constructed in accordance with a twelfth embodiment of the present invention.
Figure 24:
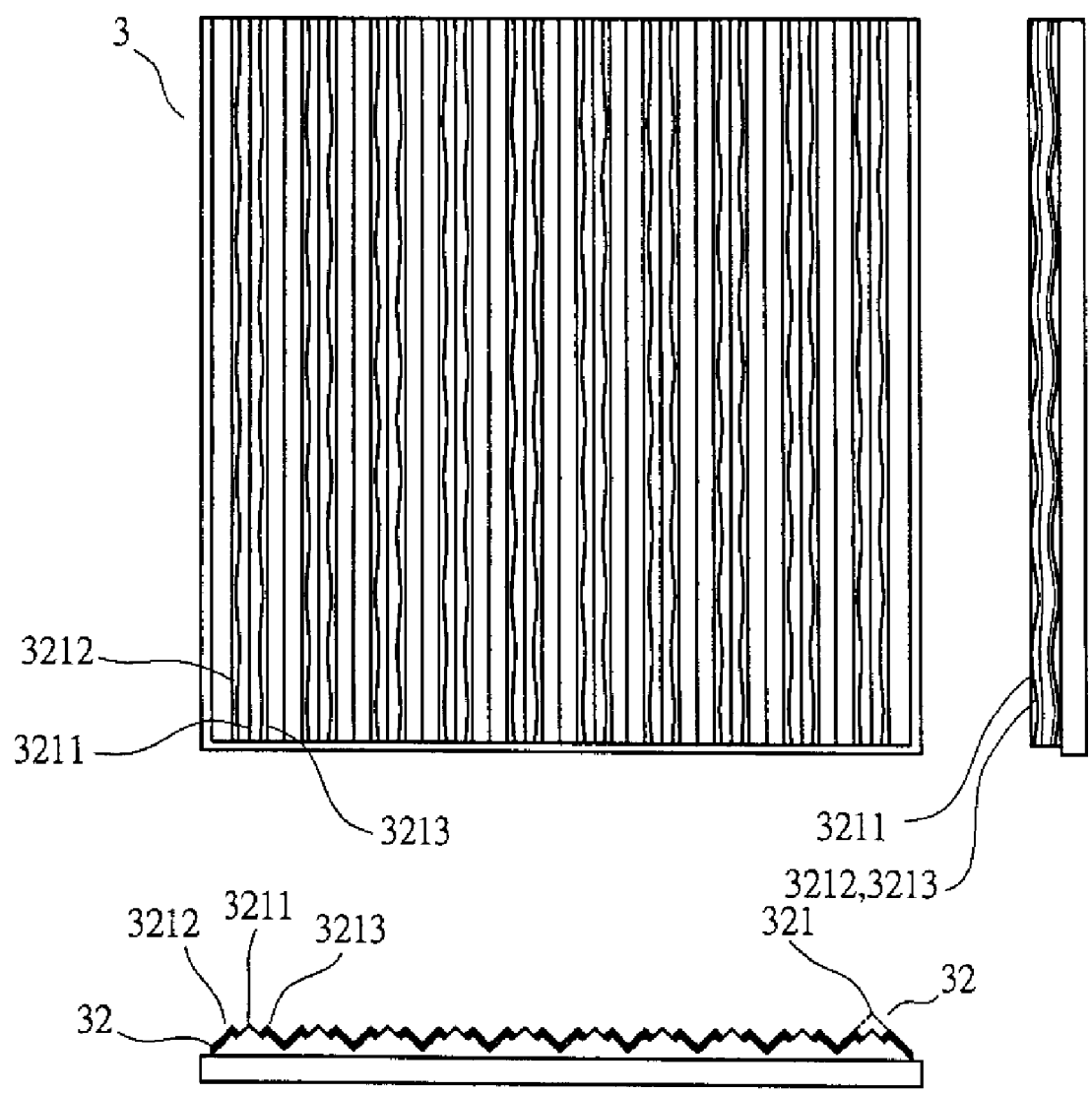
FIG. 24 shows a top plan view, an end view, and a side elevational view of the optic film of FIG. 23.

Referring to FIGS. 23 and 24, in accordance with a further embodiment of the present invention, a central ridge 3211 of the light guide 32 of the optic film 3 is of a fixed height, while side ridges 3212, 3213, which are located on opposite sides of the central ridge 3211, are made a continuous up-and-down height-variation configuration. As such, light transmitting through the optic film 3 can be of variations caused by the continuous up-and-down variation of heights of the side ridges 3212, 3213 of the light guide 32, so that the light induces no interference pattern in a liquid crystal display panel when the light passes through thin-film transistors and color filters of the liquid crystal display panel.

Figure 25:
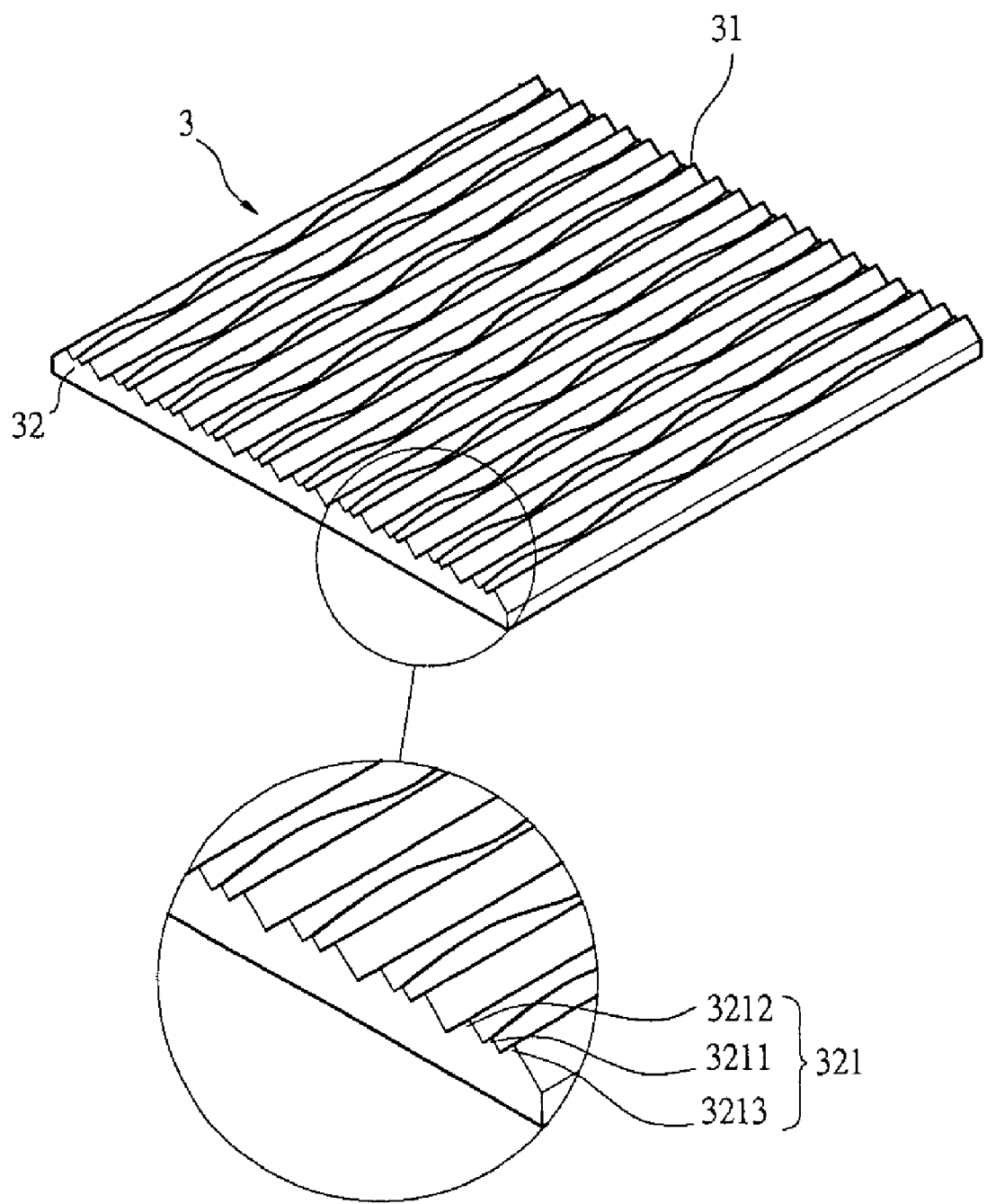
FIG. 25 shows a perspective view of an optic film constructed in accordance with a thirteenth embodiment of the present invention.
Figure 26:
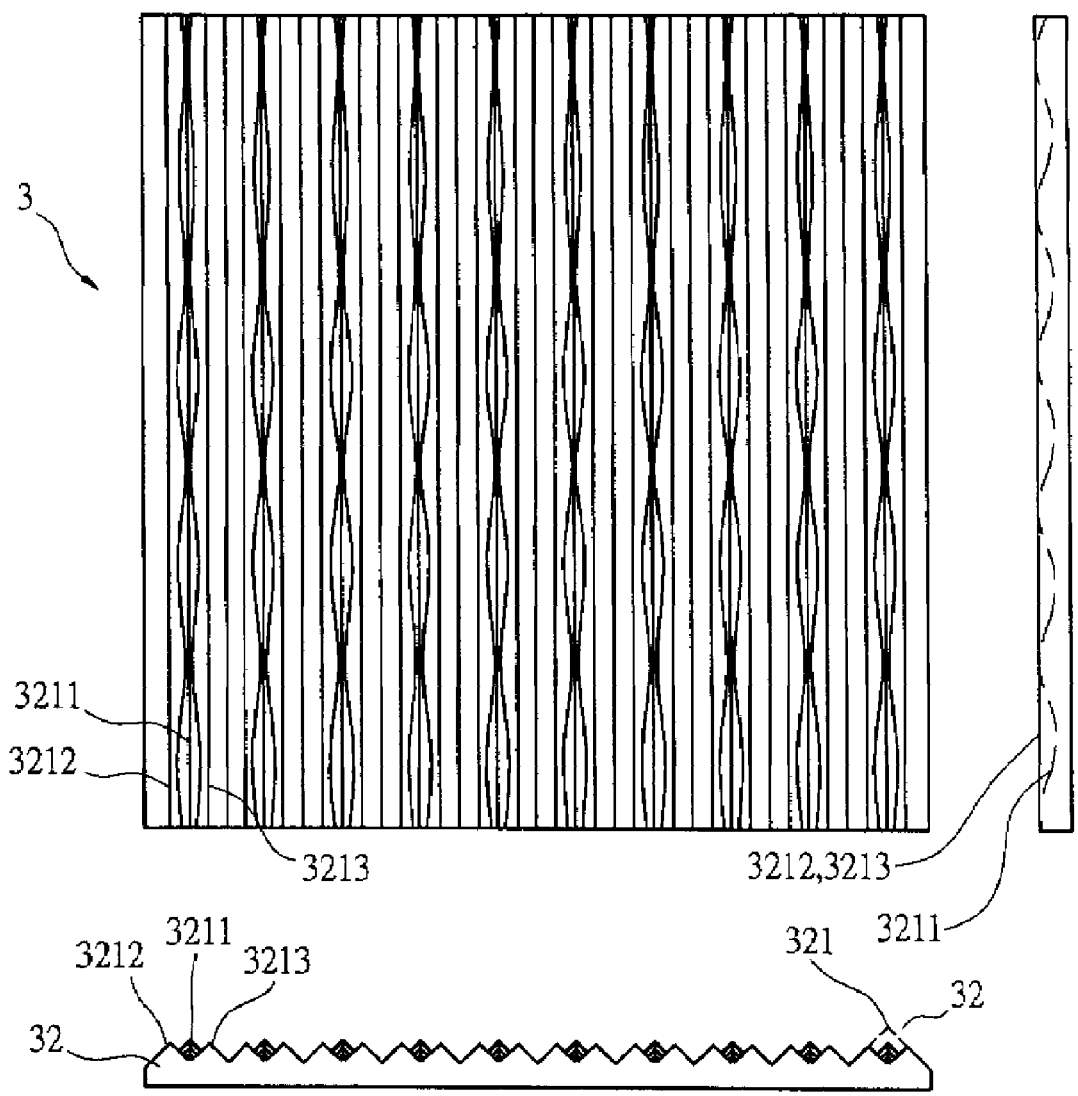
FIG. 26 shows a top plan view, an end view, and a side elevational view of the optic film of FIG. 25.

Referring to FIGS. 25 and 26, in accordance with a further embodiment of the present invention, a central ridge 3211 of the light guide 32 of the optic film 3 is made a continuous up-and-down height-variation configuration, while side ridges 3212, 3213, which are located on opposite sides of the central ridge 3211, are of fixed heights. As such, light transmitting through the optic film 3 can be of variations caused by the continuous up-and-down variation of height of the central ridges 3211 of the light guide 32, so that the light induces no interference pattern in a liquid crystal display panel when the light passes through thin-film transistors and color filters of the liquid crystal display panel.

Figure 27:
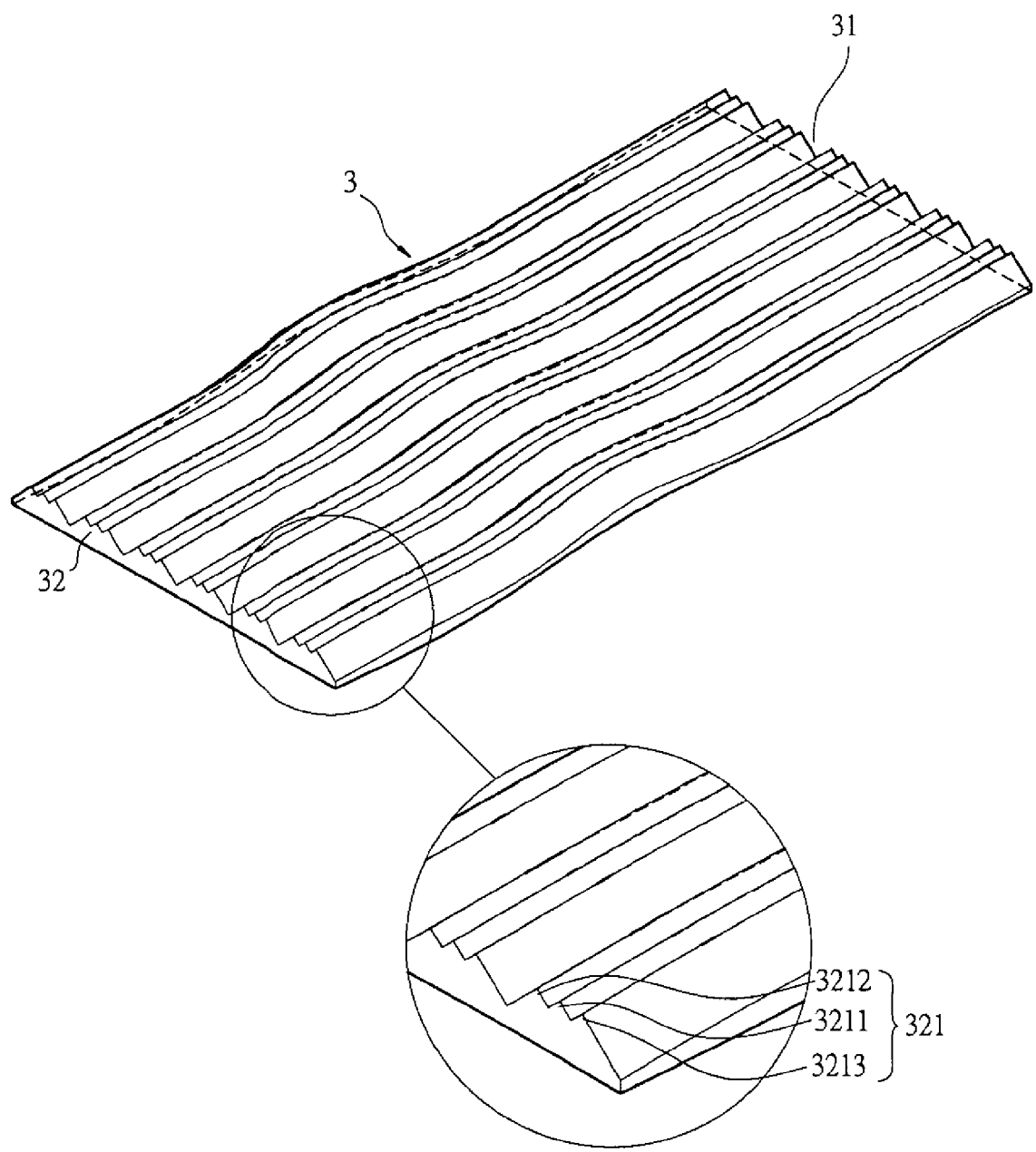
FIG. 27 shows a perspective view of an optic film constructed in accordance with a fourteenth embodiment of the present invention.
Figure 28:
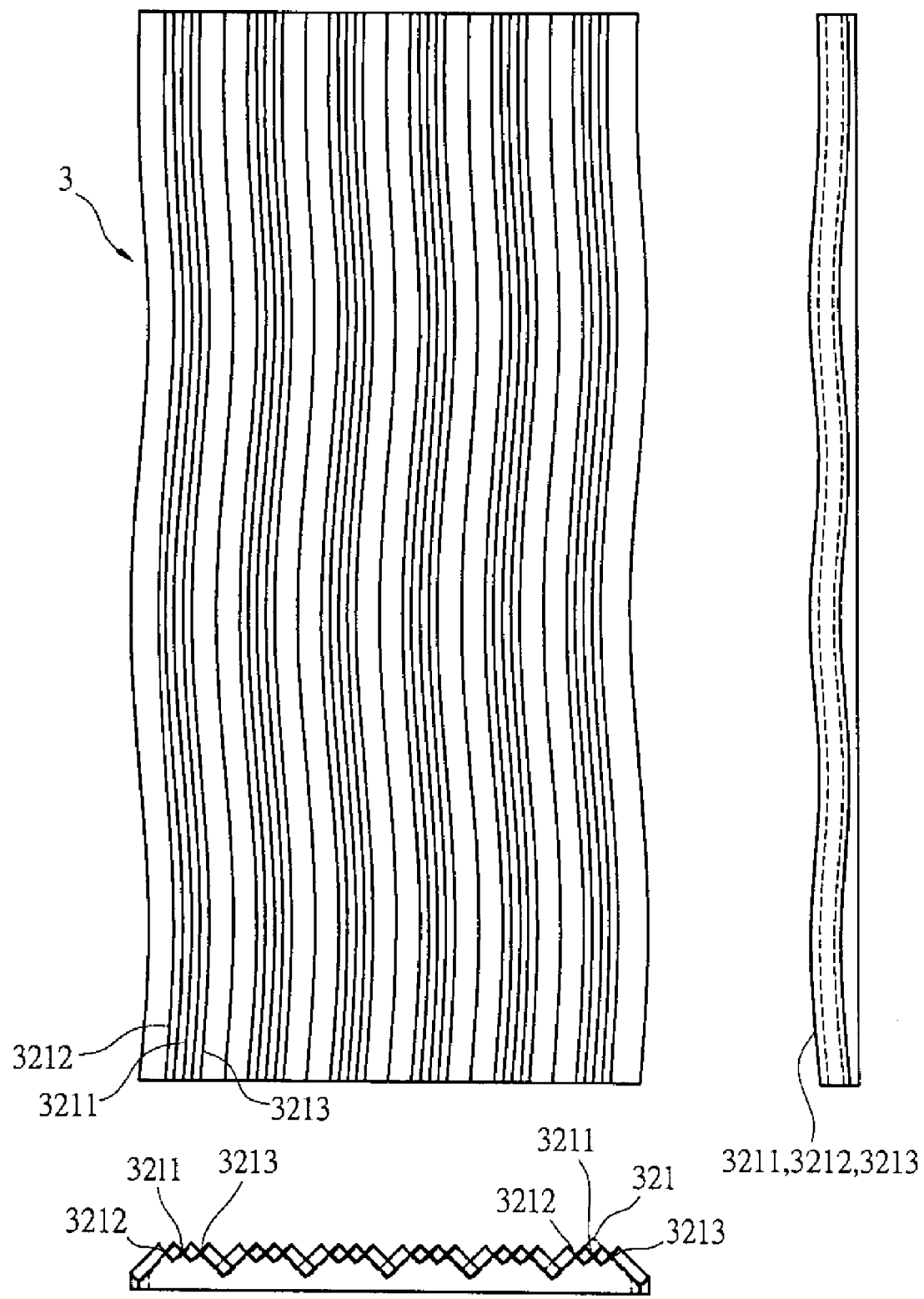
FIG. 28 shows a top plan view, an end view, and a side elevational view of the optic film of FIG. 27.

Referring to FIGS. 27 and 28, in accordance with a further embodiment of the present invention, the ridge 3211, 3212, 3213 of each light guide 32 of the optic film 3 are all made a continuous up-and-down height-variation and left-and-right wavy configuration. As such, light transmitting through the optic film 3 can be of variations caused by the light guide 32, so that the light induces no interference pattern in a liquid crystal display panel when the light passes through thin-film transistors and color filters of the liquid crystal display panel.

Figure 29:
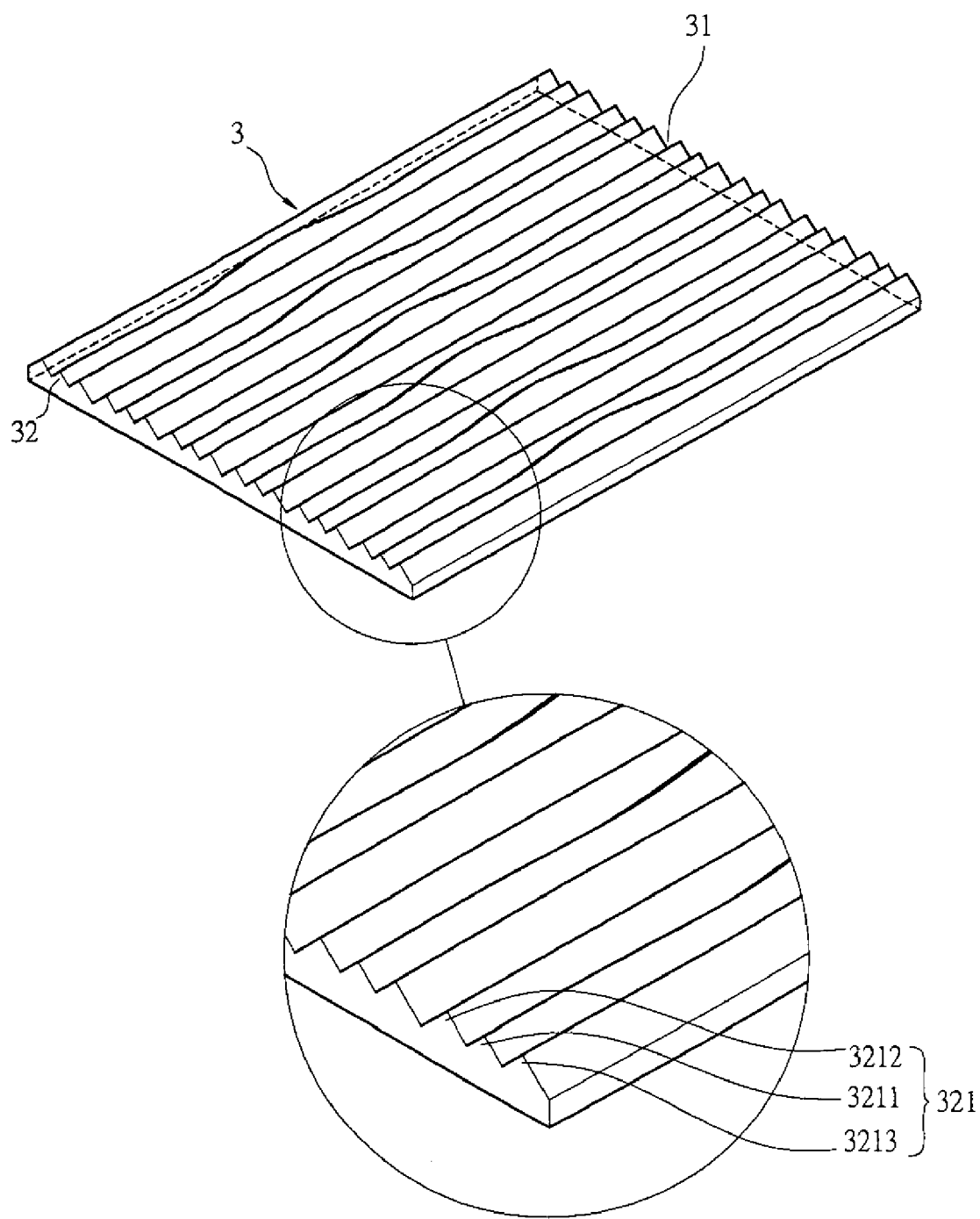
FIG. 29 shows a perspective view of an optic film constructed in accordance with a fifteenth embodiment of the present invention.
Figure 30:
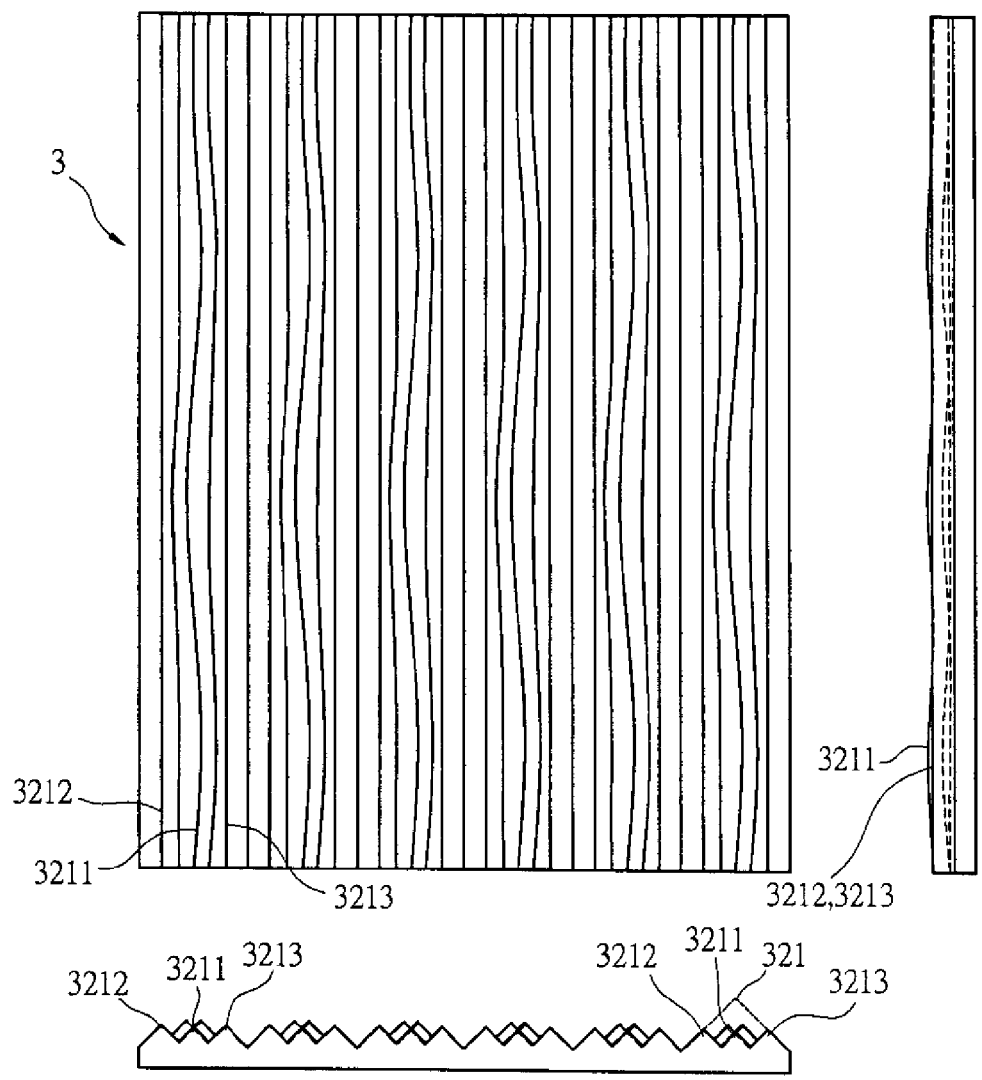
FIG. 30 shows a top plan view, an end view, and a side elevational view of the optic film of FIG. 29.

Referring to FIGS. 29 and 30, in accordance with a further embodiment of the present invention, a central ridge 3211 of the light guide 32 of the optic film 3 is made a continuous up-and-down height-variation and left-and-right wavy configuration, while side ridges 3212, 3213, which are located on opposite sides of the central ridge 3211, are made straight linear. As such, light transmitting through the optic film 3 can be of variations caused by the light guide 32, so that the light induces no interference pattern in a liquid crystal display panel when the light passes through thin-film transistors and color filters of the liquid crystal display panel.

Figure 31:
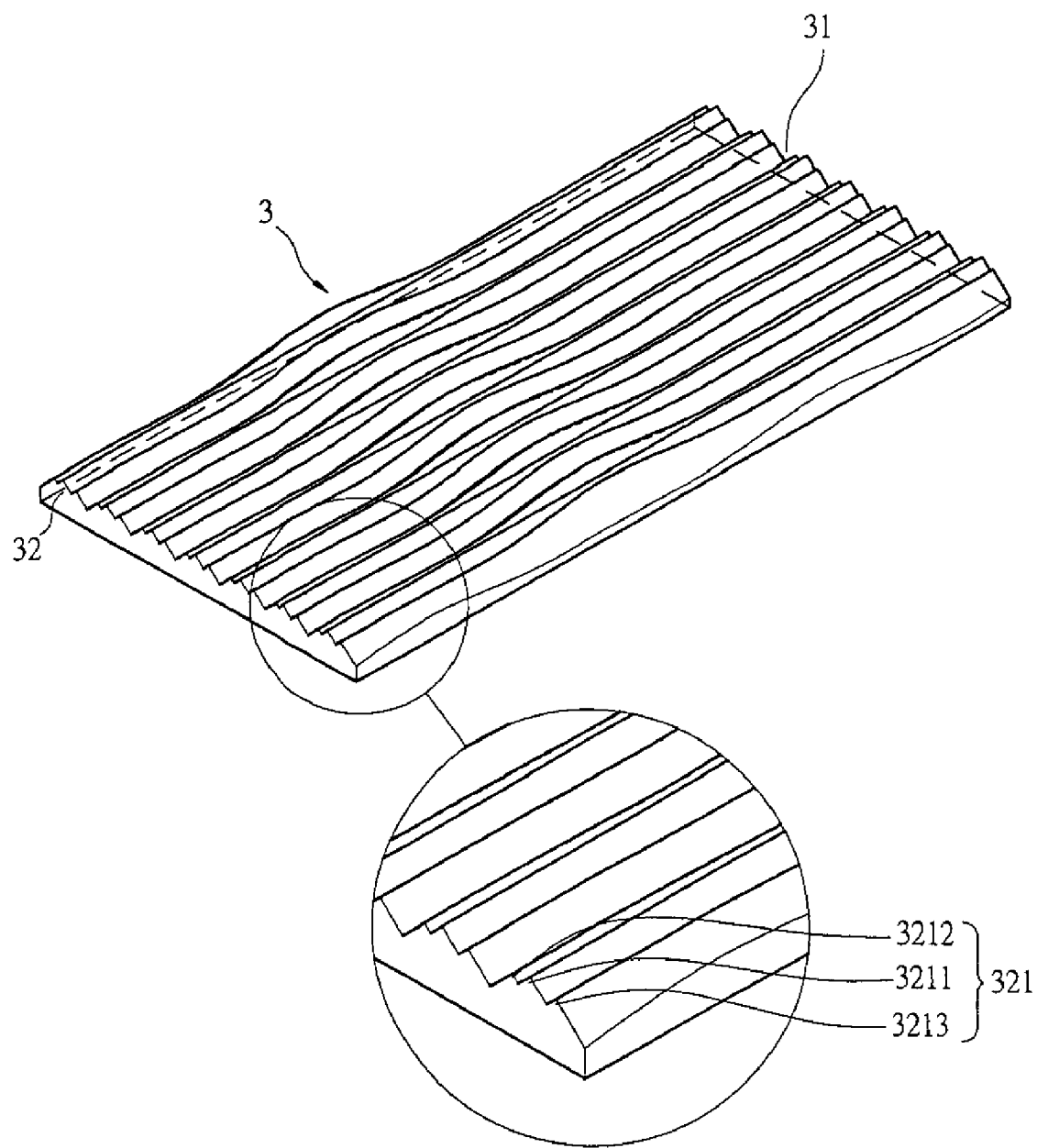
FIG. 31 shows a perspective view of an optic film constructed in accordance with a sixteenth embodiment of the present invention.
Figure 32:
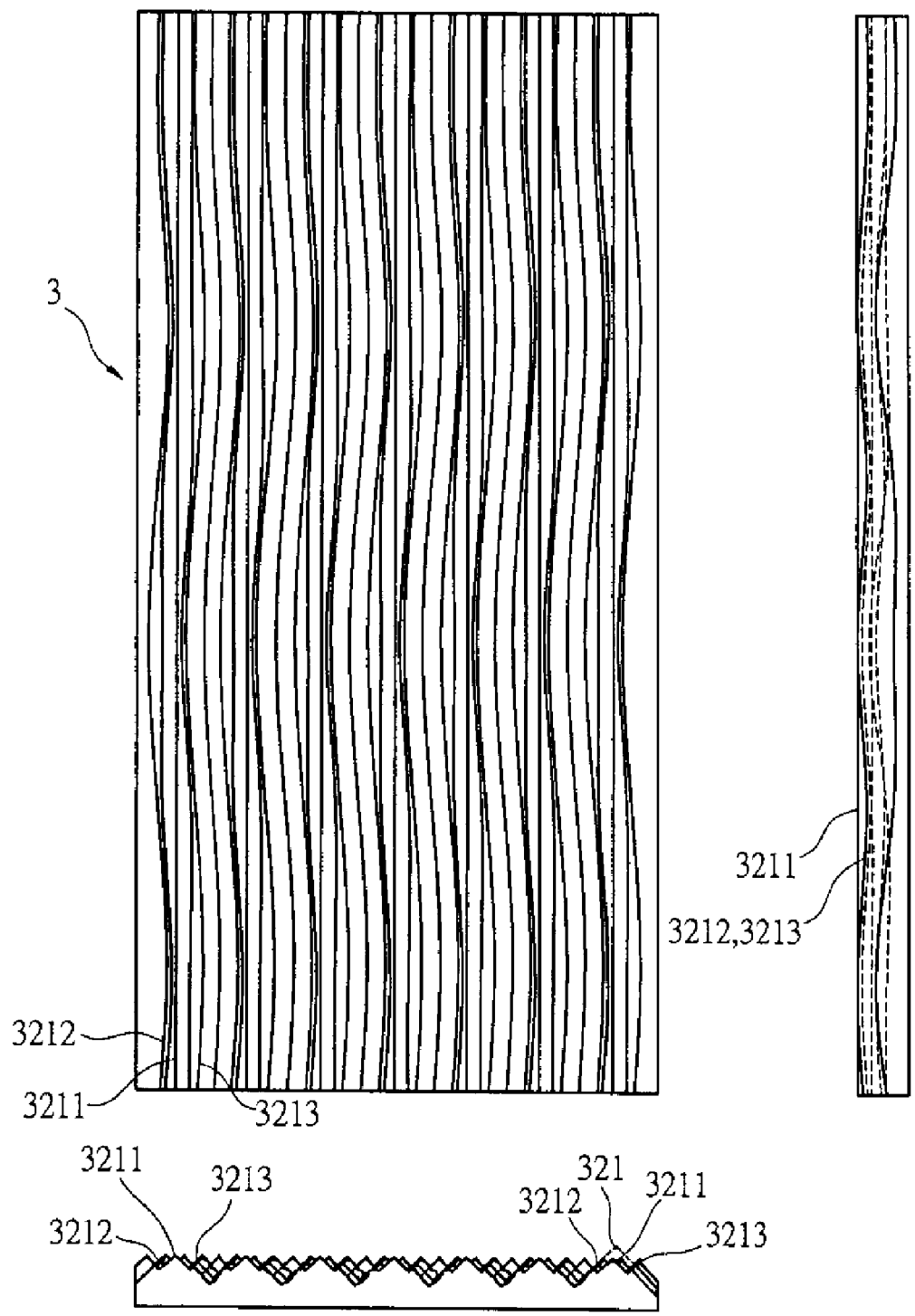
FIG. 32 shows a top plan view, an end view, and a side elevational view of the optic film of FIG. 31.

Referring to FIGS. 31 and 32, in accordance with a further embodiment of the present invention, a central ridge 3211 of the light guide 32 of the optic film 3 is made straight linear, while side ridges 3212, 3213, which are located on opposite sides of the central ridge 3211, are made a continuous up-and-down height-variation and left-and-right wavy configuration. As such, light transmitting through the optic film 3 can be of variations caused by the light guide 32, so that the light induces no interference pattern in a liquid crystal display panel when the light passes through thin-film transistors and color filters of the liquid crystal display panel.

Although the present invention has been described with reference to the preferred embodiments thereof, it is apparent to those skilled in the art that a variety of modifications and changes may be made without departing from the scope of the present invention which is intended to be defined by the appended claims.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An optic film having a surface on which a plurality of micro light guides is formed, wherein the light guide comprises at least two ridges of identical height, and a first number of the ridges of the light guide are of a continuous left-and-right wavy configuration, while a second number of the ridges are of a straight linear configuration.

2. An optic film having a surface on which a plurality of micro light guides is formed, wherein the light guide comprises at least two ridges of identical maximum height, and a first number of the ridges of the light guide are of a continuous up-and-down height-variation configuration, while a second number of the ridges are of fixed heights.

3. An optic film having a surface on which a plurality of micro light guides is formed, wherein the light guide comprises at least two ridges of identical maximum height, and each ridge of the light guide is of both a continuous left-and-right wavy configuration and a continuous up-and-down height-variation configuration.

4. An optic film having a surface on which a plurality of micro light guides is formed, wherein the light guide comprises at least two ridges of identical maximum height, and a first number of the ridges of the light guide are of a continuous left-and-right wavy configuration, while a second number of the ridges are of a continuous up-and-down height-variation configuration.

* * * * *